United States Patent
Nakamura et al.

(10) Patent No.: US 10,773,154 B2
(45) Date of Patent: Sep. 15, 2020

(54) GAME CONTROL DEVICE, GAME SYSTEM, AND INFORMATION STORAGE MEDIUM

(71) Applicant: KONAMI DIGITAL ENTERTAINMENT CO., LTD., Tokyo (JP)

(72) Inventors: Masaki Nakamura, Tokyo (JP); Yuji Fujishiro, Tokyo (JP); Kenta Ogawa, Tokyo (JP); Yugo Kishino, Tokyo (JP); Kei Masuda, Tokyo (JP); Junichi Taya, Tokyo (JP); Hideto Nishiyama, Tokyo (JP); Taku Hamasaki, Osaka (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 0 days.

(21) Appl. No.: 16/413,554

(22) Filed: May 15, 2019

(65) Prior Publication Data
US 2019/0262700 A1 Aug. 29, 2019

Related U.S. Application Data

(63) Continuation of application No. PCT/JP2017/022328, filed on Jun. 16, 2017.

(30) Foreign Application Priority Data

Nov. 21, 2016 (JP) .................. 2016-225970

(51) Int. Cl.
| | |
|---|---|
| *A63F 13/2145* | (2014.01) |
| *A63F 13/812* | (2014.01) |
| *G06F 3/0488* | (2013.01) |
| *A63F 13/22* | (2014.01) |
| *A63F 13/52* | (2014.01) |
| *A63F 13/55* | (2014.01) |
| *G06F 3/0484* | (2013.01) |
| *A63F 13/426* | (2014.01) |

(Continued)

(52) U.S. Cl.
CPC .......... *A63F 13/2145* (2014.09); *A63F 13/22* (2014.09); *A63F 13/426* (2014.09);
(Continued)

(58) Field of Classification Search
CPC .... A63F 13/22; A63F 13/2145; A63F 13/426; A63F 13/52; A63F 13/525; A63F 13/533;
(Continued)

(56) References Cited

U.S. PATENT DOCUMENTS

| | | | |
|---|---|---|---|
| 10,311,169 B1 * | 6/2019 | Leedom | .................. G06F 30/20 |
| 10,664,088 B2 * | 5/2020 | Kim | ...................... G06F 1/3262 |

(Continued)

FOREIGN PATENT DOCUMENTS

| | | |
|---|---|---|
| JP | 2009-142510 A | 7/2009 |
| JP | 5711409 B1 | 4/2015 |
| JP | 2015-153159 A | 8/2015 |

OTHER PUBLICATIONS

International Search Report of PCT/JP2017022327, dated Sep. 5, 2017, pp. 1-11.

(Continued)

*Primary Examiner* — Michael A Cuff
(74) *Attorney, Agent, or Firm* — HEA Law PLLC

(57) ABSTRACT

At least one processor of a game control device is configured to: display an object on a display region, in a game in which the object is moved in accordance with an operation of a user on a touch panel; set a first region of the display region as an operation region; move the object based on the operation of the user on the operation region; and change the operation region to a second region, in which the object is prevented from being arranged at an edge portion of the second region, in a predetermined game situation, which is one of a situation in which at least a part of the object is outside the first region and a situation in which the object is arranged at an edge portion of the first region.

11 Claims, 27 Drawing Sheets

(51) Int. Cl.
 *A63F 13/533* (2014.01)
 *A63F 13/525* (2014.01)

(52) U.S. Cl.
 CPC ............ *A63F 13/52* (2014.09); *A63F 13/525* (2014.09); *A63F 13/533* (2014.09); *A63F 13/55* (2014.09); *A63F 13/812* (2014.09); *G06F 3/0484* (2013.01); *G06F 3/0488* (2013.01); *G06F 3/04886* (2013.01)

(58) Field of Classification Search
 CPC ...... A63F 13/55; G06F 3/0484; G06F 3/0488; G06F 3/04886; G06F 3/04883
 USPC .......................................................... 463/31
 See application file for complete search history.

(56) References Cited

U.S. PATENT DOCUMENTS

| | | | |
|---|---|---|---|
| 2011/0154228 A1* | 6/2011 | Kinoshita | G06F 3/04883 715/763 |
| 2015/0316989 A1* | 11/2015 | Mishio | G06F 3/016 345/173 |
| 2016/0048291 A1* | 2/2016 | Boshoff | G06F 3/04842 715/834 |
| 2016/0065832 A1* | 3/2016 | Kim | H04N 13/128 348/207.11 |
| 2017/0201686 A1* | 7/2017 | Choi | H04N 5/225 |
| 2019/0066297 A1* | 2/2019 | Middlebrooks | A61B 5/7264 |
| 2019/0262709 A1* | 8/2019 | Nakamura | A63F 13/2145 |

OTHER PUBLICATIONS

International Search Report of PCT/JP2017022328, dated Sep. 5, 2017, pp. 1-11.
PCT/IB/373 of PCT/JP2017022327, dated May 31, 2019, pp. 1-10.
PCT/IB/373 of PCT/JP2017022328, dated May 31, 2019, pp. 1-7.
Computer generated English translation of the Office Action for corresponding application 2016-225969, dated Dec. 14, 2017, pp. 1-5.

* cited by examiner

FIG.12

| HISTORY | | BASE POSITION | PASS INPUT START FLAG | PULL OPERATION FLAG |
|---|---|---|---|---|
| TIME POINT | TOUCH POSITION | | | |
| t0 | (X0,Y0) | (X1,Y1) | ON | OFF |
| t1 | (X1,Y1) | | | |
| t2 | (X2,Y2) | | | |
| t3 | (X3,Y3) | | | |
| ⋮ | ⋮ | | | |

GAME CONTROL DEVICE, GAME SYSTEM, AND INFORMATION STORAGE MEDIUM

CROSS-REFERENCE TO RELATED APPLICATION

The present disclosure contains subject matter related to that disclosed in Japanese Patent Application JP 2016-225970 filed in the Japan Patent Office on Nov. 21, 2016 and International Patent Application PCT/JP2017/022328 filed in the Japan Patent Office on Jun. 16, 2017, the entire contents of which are hereby incorporated by reference.

BACKGROUND OF THE INVENTION

1. Field of the Invention

The present invention relates to a game control device, a game system, and an information storage medium.

2. Description of the Related Art

In recent years, with the spread of smartphones and tablet type terminals, the number of games using a touch panel has increased. For example, in Japanese Patent Application Laid-open No. 2015-153159, the following technology is described. Specifically, in a game in which an object, such as a ball, is moved by using a touch panel, when a user touches near an object displayed on a display to instruct a trajectory of the object, the object is moved based on the instructed trajectory. In relation to this technology, there is also known a game in which the trajectory of an object is controlled based on a display position of the object and a trajectory input by sliding a finger, a touch pen, or the like from the display position of the object. As described above, in a game using a touch panel in the related art, there is known a game in which the trajectory of an object is instructed based on any touch position on the touch panel as a starting point.

SUMMARY OF THE INVENTION

Incidentally, in a game in which an object, such as a ball, is moved by using a touch panel, it is not required to set the object as the starting point position of the touch as in the related-art game, and for example, any position on a display region of the display may be set as the starting point position of the touch. In this case, the user can move the object by touching a position different from the display position of the object to instruct the trajectory of the object.

However, users accustomed to the related-art game in which the trajectory of an object is instructed with the display position of the object as the starting point of the touch, and users who intuitively perform operations specific to a touch panel, tend to touch the object first. For example, when an operation region for instructing movement of the object is not the entire display region but is a part of the display region, and is set to a place different from the display position of the object, the object does not move even when the display position of the object is set as the starting point of the touch. In such a case, the tendency of user to first touch an object may cause an erroneous operation.

The present invention has been made in view of the above-mentioned problem, and it is an object of the present invention to prevent an erroneous operation in a game using a touch panel.

In order to solve the above-mentioned problem, according to one embodiment of the present invention, there is provided a game control device including at least one processor, the at least one processor being configured to: display an object on a display region, in a game in which the object is moved in accordance with an operation of a user on a touch panel; set a first region of the display region as an operation region; move the object based on the operation of the user on the operation region; and change the operation region to a second region, in which the object is prevented from being arranged at an edge portion of the second region, in a predetermined game situation, which is one of a situation in which at least a part of the object is outside the first region and a situation in which the object is arranged at an edge portion of the first region.

According to one embodiment of the present invention, there is provided a game system including at least one processor, the at least one processor being configured to: display an object on a display region, in a game in which the object is moved in accordance with an operation of a user on a touch panel; set a first region of the display region as an operation region; move the object based on the operation of the user on the operation region; and change an operation region to a second region, in which the object is prevented from being arranged at an edge portion of the second region, in a predetermined game situation, which is one of a situation in which at least a part of the object is outside the first region and a situation in which the object is arranged at an edge portion of the first region.

BRIEF DESCRIPTION OF THE DRAWINGS

FIG. 12 is a table for showing an example of touch situation data.

DETAILED DESCRIPTION OF THE INVENTION

1. First Embodiment

Figure 1:
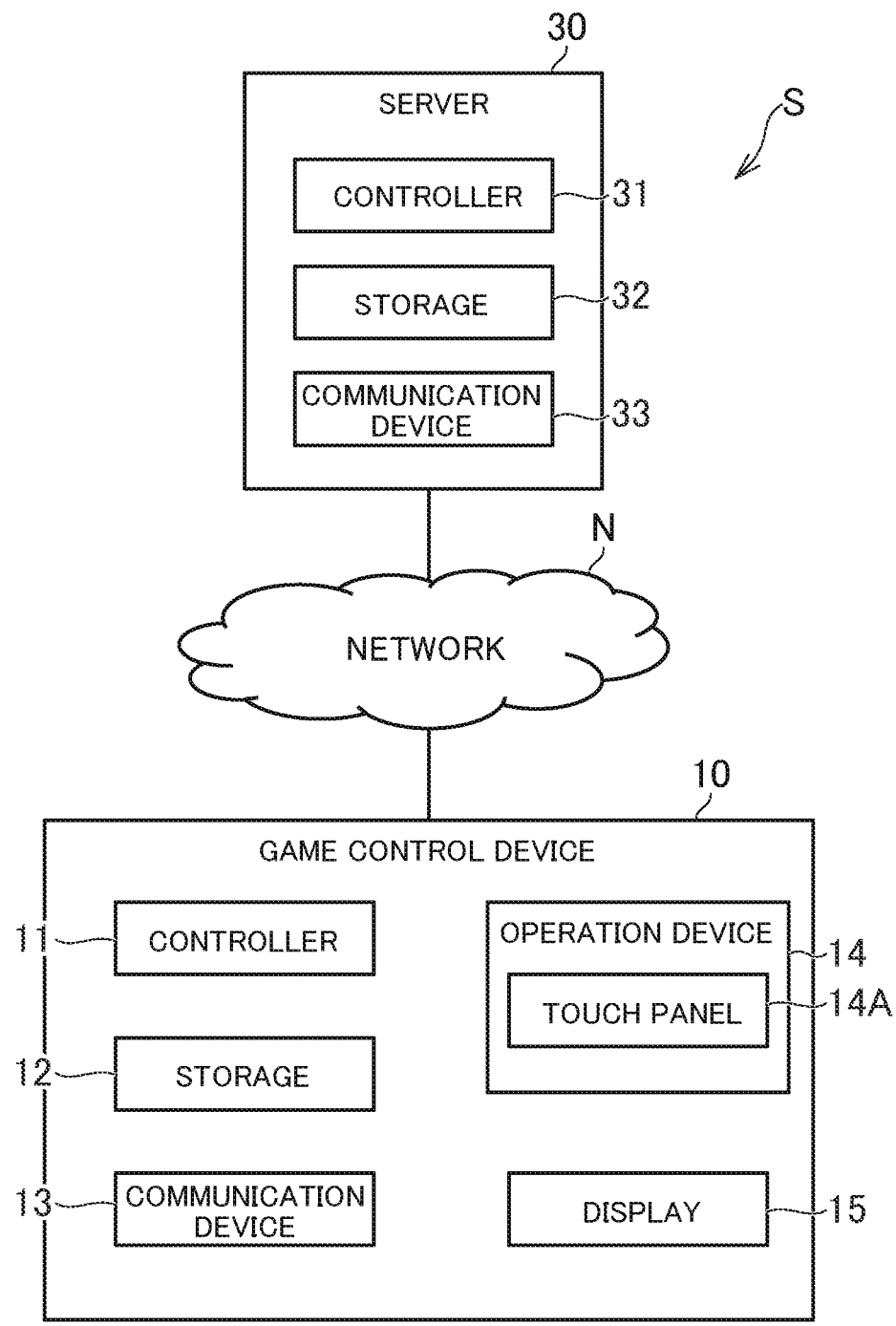
FIG. 1 is a diagram for illustrating an overall configuration of a game system according to one embodiment of the present invention.

In the following, embodiments of the present invention are described with reference to the drawings. In the drawings, the same or corresponding components are denoted by the same reference symbols, and a repetitive description thereof may be omitted.

1-1. Hardware Configuration of Game System and Game Control Device

FIG. 1 is a diagram for illustrating an overall configuration of a game system. As illustrated in FIG. 1, a game system S according to a first embodiment of the present invention includes a game control device 10 and a server 30. The game control device 10 and the server 30 are connected to a network N, such as the Internet. Therefore, mutual data communication is possible between the game control device 10 and the server 30.

The game control device 10 is a computer operated by a user. For example, the game control device 10 may be a mobile terminal (e.g., cell phone such as smartphone or tablet computer), a personal computer, a portable game machine, a video game console, a commercial game machine, or a multifunctional television receiver (smart television) having an information processing function. In the following, there is described a case in which a cell phone including a touch panel is the game control device 10, and a program supplied from the server 30 is executed on the cell phone. The program may also be supplied via a server, a recording medium, or the like different from the server 30.

As illustrated in FIG. 1, the game control device 10 includes a controller 11, a storage 12, a communication device 13, an operation device 14, and a display 15. The controller 11 includes at least one microprocessor. The controller 11 executes processing in accordance with an operating system and other programs. The storage 12 includes a main storage (e.g., random-access memory (RAM)) and an auxiliary storage (e.g., nonvolatile semiconductor memory). The storage 12 stores programs and data. For example, when the game control device 10 is a personal computer or the like, the storage 12 may include an auxiliary storage such as a hard disk drive or a solid-state drive. The communication device 13 includes a communication interface such as a network card. The communication device 13 performs data communication via the network N.

The operation device 14 is an input device and includes a touch panel 14A. As the touch panel 14A, various types of touch panels, such as an electrostatic capacitance type and a resistive film type, may be employed. The touch panel 14A detects a touch position. The controller 11 acquires, based on the detection signal of the touch panel 14A, coordinate information indicating the touch position. For example, the touch panel 14A is arranged so as to be superimposed on the display 15. More specifically, the touch panel 14A is arranged above the display. The touch panel 14A and the display 15 may be integrated or may be arranged separately.

The operation device 14 may include an input device other than the touch panel 14A. The operation device 14 may include, for example, a button, a key, a lever, a game controller (game pad), a pointing device such as a mouse, or a keyboard. For example, the operation device 14 may also include a microphone and a camera for the user to perform an input operation by voice or gestures.

The display 15 is, for example, a liquid crystal display panel or an organic EL display, and displays a screen in accordance with an instruction from the controller 11. It is not required for the operation device 14 and the display 15 to be incorporated in the game control device 10, and the operation device 14 and the display 15 may be external devices connected to the game control device 10.

The server 30 is a server computer. As illustrated in FIG. 1, the server 30 includes a controller 31, a storage 32, and a communication device 33. The hardware configurations of the controller 31, the storage 32, and the communication device 33 may be the same as the controller 11, the storage 12, and the communication device 13, respectively. For example, the server 30 stores a game program, and delivers the game program in response to a request from the game control device 10.

The programs and data described as being stored in the storage 12 or the storage 32 may be supplied to the game control device 10 or the server 30 via the network N, for example. The game control device 10 or the server 30 may include a reader (e.g., optical disc drive or a memory card slot) for reading programs or data stored on an information storage medium (e.g., optical disc and memory card). Then, a program or data may be supplied to the game control device 10 or the server 30 via the information storage medium.

1-2. Game Outline

In the game control device 10, a game using the touch panel 14A is executed. In a game using the touch panel 14A, for example, the user performs an operation by touching the touch panel 14A. The touch is, for example, an action of an object touching the touch panel 14A. The object may be, for example, a part of the user, such as a finger, or an object other than the user, such as a touch pen.

The user may move the touch position while touching the touch panel 14A. The touch position is, for example, the position on the touch panel 14A that the object is touching, and is coordinates detected by the touch panel 14A. The touch position is acquired each time interval determined based on a frame rate, for example. The touch position may be acquired for every frame, or may be acquired each time a predetermined frame elapses. An act in which the object touching the touch panel 14A separates from the touch panel 14A is referred to as releasing the touch in the first embodiment.

In the game control device 10, various types of games such as a sports game, an action game, and a role-playing game may be executed. However, in the first embodiment, a game in which a user object and an opponent object play a match against each other in a virtual world is executed.

The object is an object that may be used, for example, in the game. For example, the object is a virtual moving object arranged in the virtual world. For example, when the virtual world is three-dimensional, the object is a three-dimensional model (3D object), and when the virtual world is two-dimensional, the object is an object represented as an image. For example, a moving object (ball or puck), a character, or a vehicle (e.g., airplane or tank) corresponds to an example of the "object". In the case of a sports game, an example of the character is a player character.

The user object is, for example, an object used by the user in the game, and is a so-called player character (operation subject of user). For example, the user object is an object that performs an action based on an instruction from the user. For example, the user object performs a type of action associated with the instruction from the user. For example, the user object moves in the direction instructed by the user, or performs the action instructed by the user. For example, the user object may also be an object that is used together with the operation subject of the user. In this case, the user object performs actions based on a predetermined algorithm.

The opponent object is, for example, a game object that an opponent uses in the game, and is a so-called non-player character. For example, the opponent may be a computer (CPU) or another user. For example, the opponent object may perform actions based on a predetermined algorithm or perform actions based on operations by another user. An algorithm is a set of instructions indicating a calculation procedure (set of mathematical formulas, conditional expressions, and other expressions for determining, for example, a movement direction and a movement speed) for determining the actions of the object.

The virtual world is a world in the game, and is, for example, a stadium in the game. The virtual world may be a three-dimensional space or a two-dimensional plane. The virtual world may be referred to as a virtual space or a game space.

In the first embodiment, a character is described as an example of an object. Therefore, the user object may also be hereinafter referred to as a user character, and the opponent object may also be hereinafter referred to as an opponent character. In the following description, the term "character" may be read as "object". As an example of the game, there is described a sports match in which the user character and the opponent character play a sports game in the virtual world. As an example of the sports game, a soccer game is described. For example, a game is executed in which a plurality of user characters belonging to a user team and a plurality of opponent characters belonging to an opposing team play a soccer match in the virtual world.

Figure 2:
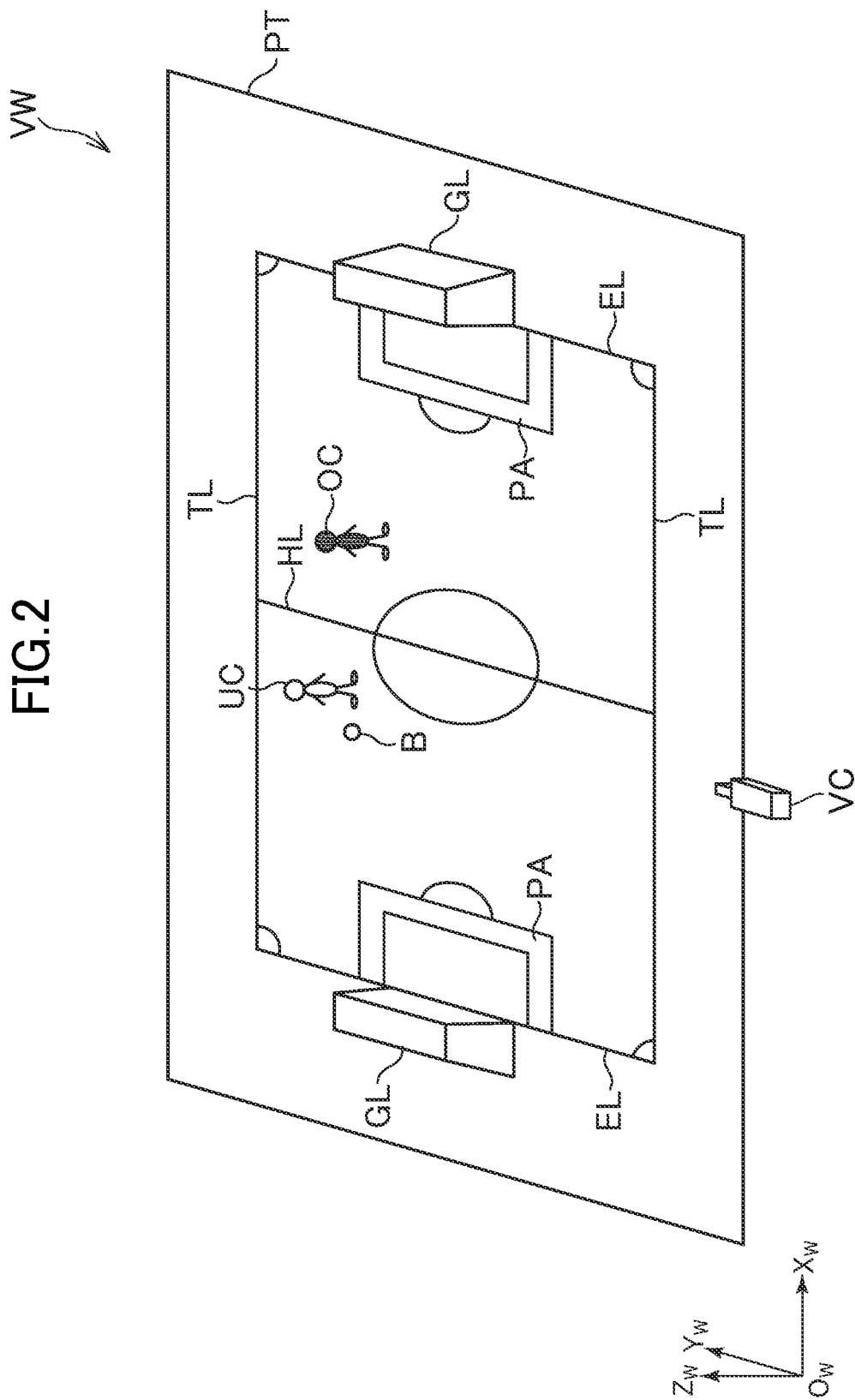
FIG. 2 is a diagram for illustrating an example of a virtual world.

FIG. 2 is a diagram for illustrating an example of the virtual world. As illustrated in FIG. 2, a virtual world VW represents, for example, a virtual soccer field in a three-dimensional space. In the virtual world VW, a predetermined position is an origin Ow, and an Xw axis, a Yw axis, and a Zw axis (coordinate axes of world coordinate system) orthogonal to each other are set. Positions in the virtual world VW are specified by coordinate values in the world coordinate system.

As illustrated in FIG. 2, a pitch PT, which is a 3D model of a pitch, is arranged in the virtual world VW so as to be parallel to the Xw-Yw plane. On the pitch PT, for example, touchlines TL, goal lines EL, a half way line HL, and penalty areas PA are drawn. On the pitch PT, for example, a user character UC, an opponent character OC, a ball B, which is a 3D model of the ball, and goals GL, which are 3D models of the goals, are arranged.

A virtual viewpoint VC is set in the virtual world VW. The virtual viewpoint VC is a viewpoint set in the virtual world VW, and is, for example, a virtual camera. A position and a line-of-sight direction of the virtual viewpoint VC may be fixed, but in the first embodiment, it is assumed that the virtual camera is controlled to include at least one of the ball BL and the user character UC serving as the operation subjects of the user in a field of view of the user. When the game starts, a virtual world image representing an appearance of the virtual world VW from the virtual viewpoint VC is displayed on the display 15.

Figure 3:
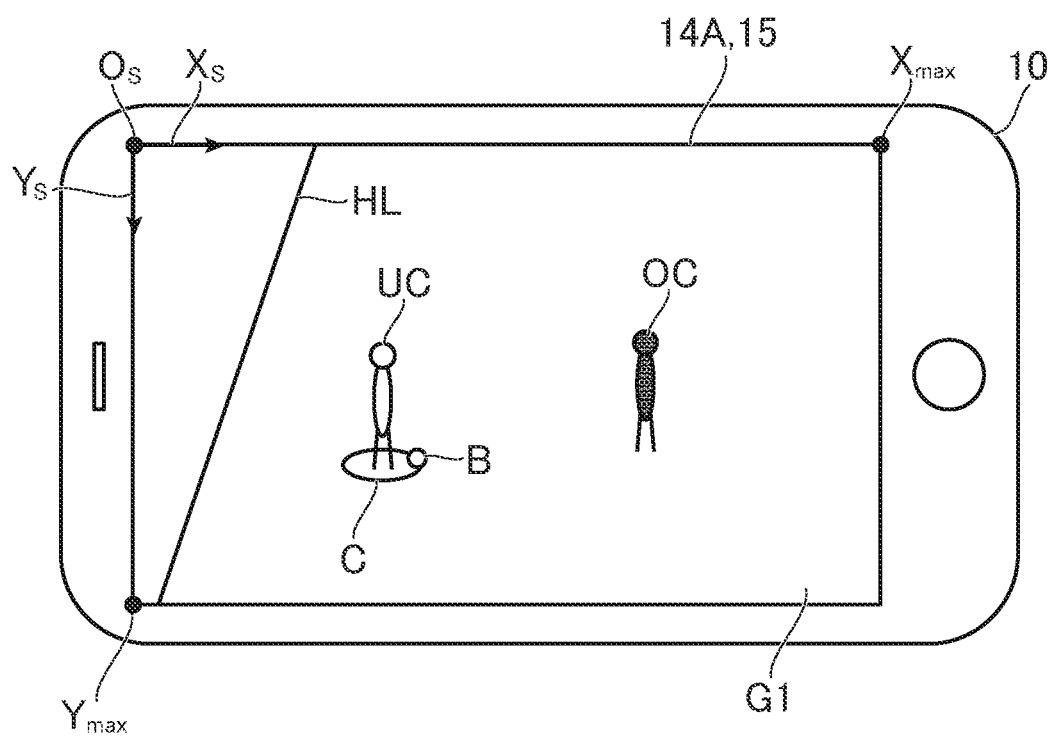
FIG. 3 is a diagram for illustrating an example of a virtual world image.

FIG. 3 is a diagram for illustrating an example of the virtual world image. As illustrated in FIG. 3, of the virtual world VW, the appearance in the field of view of the virtual viewpoint VC is displayed in a virtual world image G1 by converting the coordinates. In a display region of the display 15, a predetermined position (e.g., upper left of display region) is set as an origin Os, and an Xs axis and a Ys axis orthogonal to each other (coordinate axes of the screen coordinate system) are set. The display region is, for example, a whole part of the screen of the display 15. The position on the display region is specified by the coordinate values in the screen coordinate system.

For example, the Xs coordinate value of the right edge portion of the display region is represented by $X_{MAX}$, and the lower edge portion Ys coordinate value of the display region is represented by $Y_{MAX}$. In the first embodiment, there is described a case in which the game is played under a state in which a lateral width is longer than a longitudinal width (state in which game control device 10 is held horizontally), but conversely to this, the game may also be played under a state in which the longitudinal width is longer than the lateral width (state in which game control device 10 is held vertically). In the first embodiment, the touch position detected by the touch panel 14A is also represented by the coordinate values of the screen coordinate system, but the touch position may be represented by coordinate values of other coordinate axes.

The user plays the game by operating the touch panel 14A while viewing the virtual world image G1. For example, a cursor C for identifying the operation subject is displayed at feet of the user character UC set as the operation subject of the user. The user may be able to perform various operations via the touch panel 14A. However, in the first embodiment, the region on the touch panel 14A is divided into a plurality of operation regions. A separate operation mode is defined for each operation region. The user performs an operation corresponding to the touched operation region.

Figure 4:
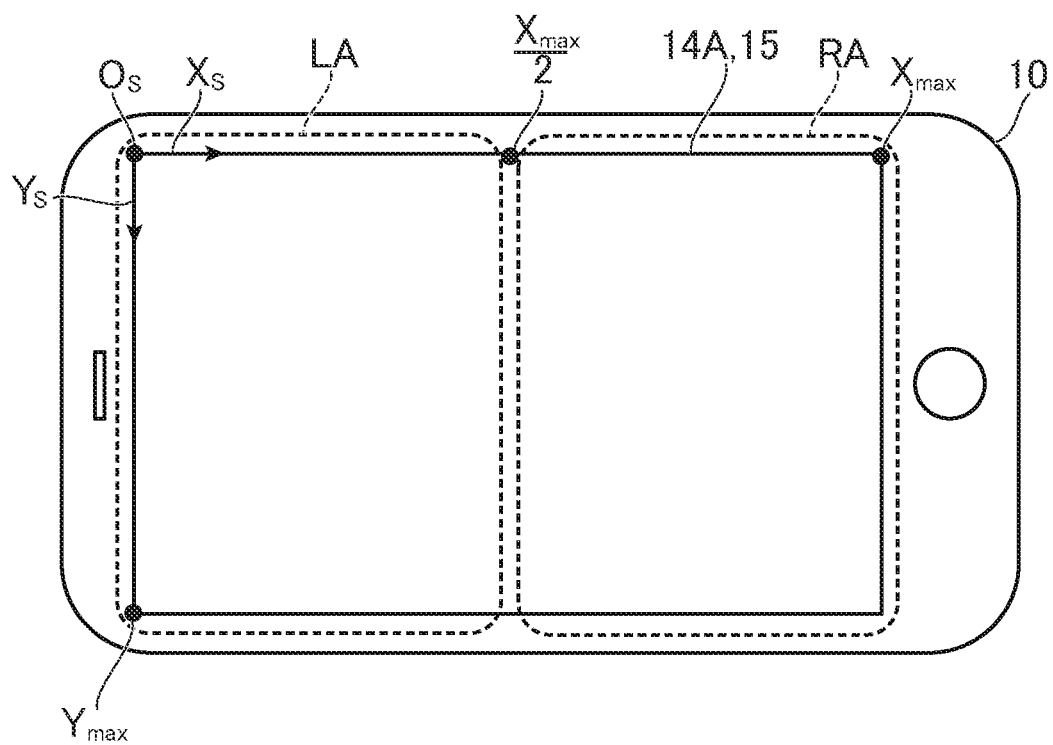
FIG. 4 is a diagram for illustrating a plurality of regions set on a touch panel.

FIG. 4 is a diagram for illustrating a plurality of regions set on the touch panel 14A. As illustrated in FIG. 4, in the first embodiment, a left-side region LA and a right-side region RA are set with the center of the touch panel 14A set as a boundary. For example, the left-side region LA is a region in which the $X_S$ coordinate is less than $X_{MAX}/2$ and the right-side region RA is a region in which the $X_S$ coordinate is $X_{MAX}/2$ or more. The left-side region LA is mainly used, for example, to instruct movement of the user character UC. The right-side region RA is mainly used, for example, to instruct movement of the ball B.

In this case, the center of the touch panel 14A serves as the boundary of the operation region, but the boundary of the operation region may be set to any place. In this description, there is described a case in which two regions, namely, the left-side region LA and the right-side region RA, are set, but the number of operation regions to be set on the touch panel 14A is not limited to two, and three or more operation regions may be set.

In the first embodiment, the operation mode for the left-side region LA and for the right-side region RA is different between attack and defense. Attack is, for example, a state in which the user team is in possession of the ball B. Defense is, for example, a state in which the opposing team is in possession of the ball B. A state in which neither team possesses the ball B may be classified as attack or may be classified as defense. Even when the user team possesses the ball B, when the ball B is in the user team's own half, such a state may be classified as defense. The term own half refers to the goal GL side of the user team from the half way line HL of the pitch PT.

First, there is described an operation mode during attack. In the first embodiment, during attack, the user character UC in possession of the ball B is set as the operation subject. Therefore, during attack, the user instructs the user character UC in possession of the ball B to perform an action.

Figure 5:
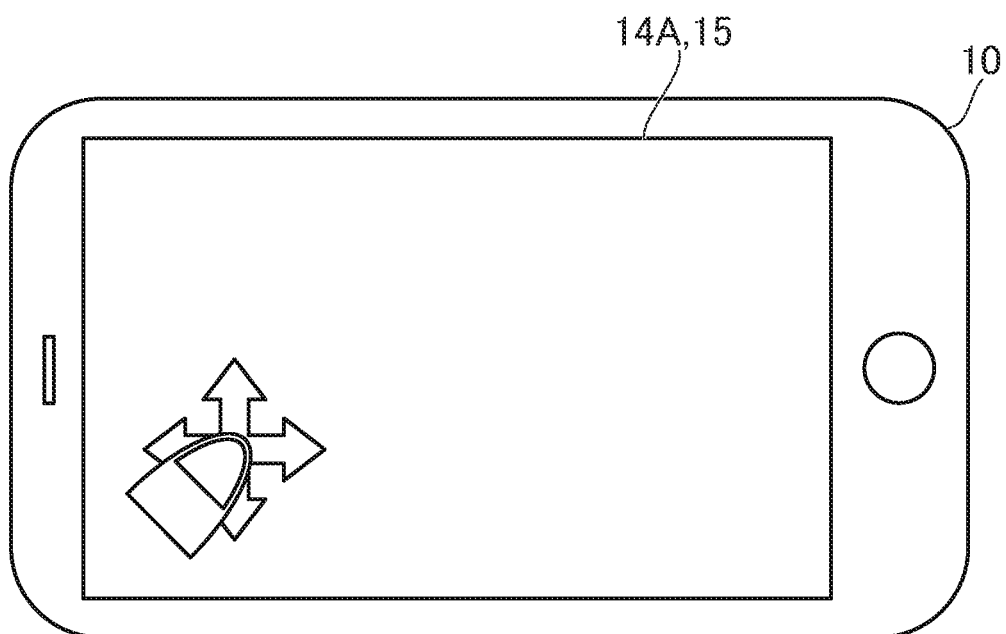
FIG. 5 is a diagram for illustrating an example of an operation on a left-side region during attack.
Figure 5:
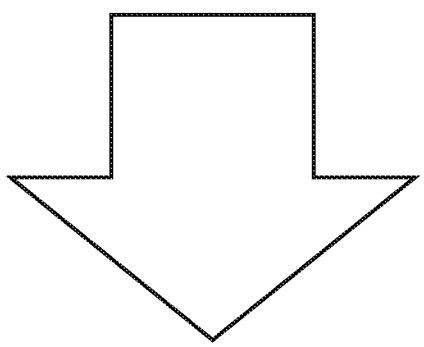
Figure 5:
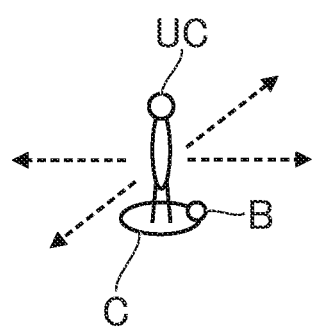

FIG. 5 is a diagram for illustrating an example of an operation on the left-side region LA during attack. In order to simplify the description, the virtual world image G1 is omitted here. As illustrated in FIG. 5, for example, when the user performs a slide operation on the left-side region LA, the user character UC dribbles in the slide direction. The slide operation is, for example, an operation in which the user touches the touch panel 14A, then moves the touch position while maintaining the touch, and keeps on maintaining the touch even after the movement. For example, with the touch position at which the touch started as a starting point, the direction from the starting point to the current touch position is the sliding direction. When the current touch position moves away from the touch position of the starting point, the starting point may be updated so as to become closer to the current touch position.

Figure 6:
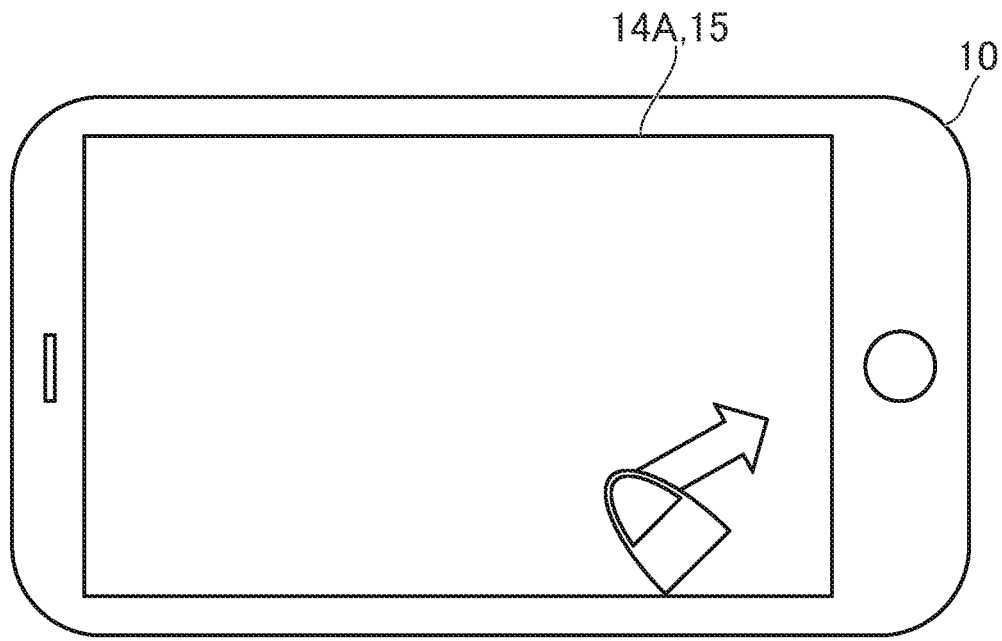
FIG. 6 is a diagram for illustrating an example of an operation on a right-side region during attack.
Figure 6:
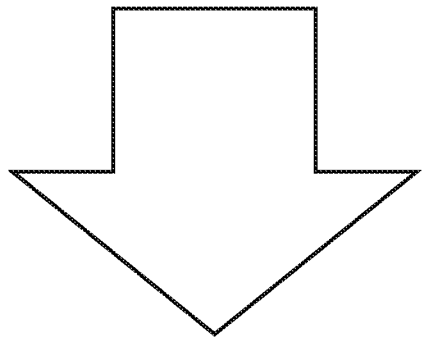
Figure 6:
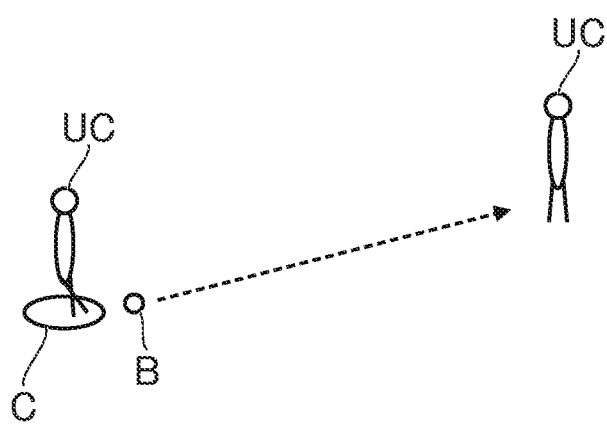

FIG. 6 to FIG. 9 are diagrams for illustrating examples of operations on the right-side region RA during attack. As illustrated in FIG. 6, for example, when the user performs a flick operation on the right-side region RA, the user character UC performs a ground pass in the flick direction. The flick operation is, for example, an operation in which the user touches the touch panel 14A, then quickly moves the touch position while maintaining the touch, and releases the touch. The ground pass is, for example, a pass that is performed in a low trajectory to a player on the same team. When the user character UC performs a ground pass, for example, the ball B moves toward a receiver while rolling along the pitch PT.

Figure 7:
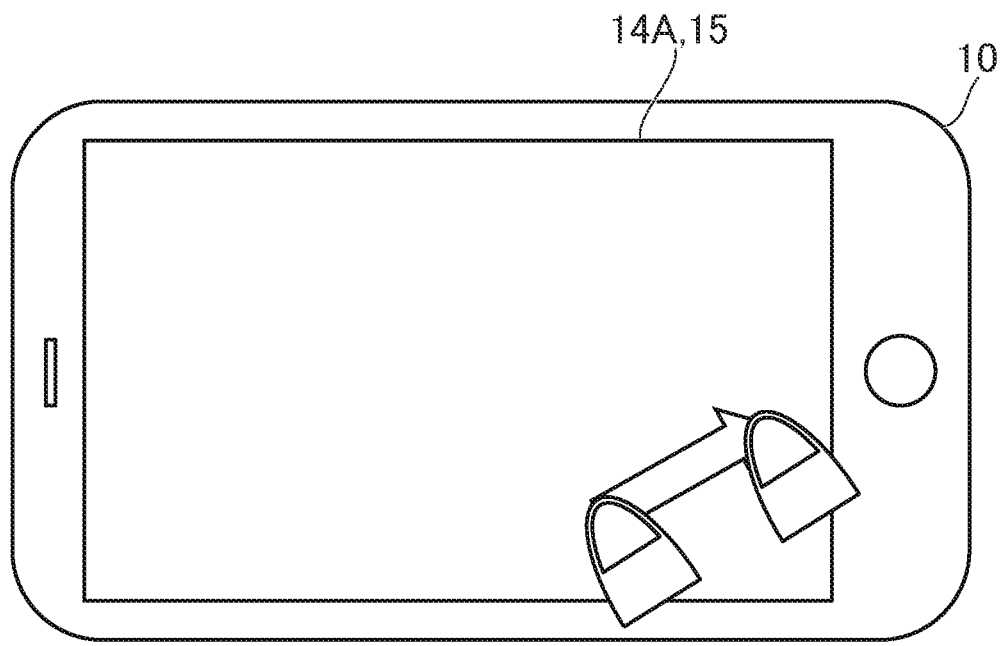
FIG. 7 is a diagram for illustrating an example of an operation on the right-side region during attack.
Figure 7:
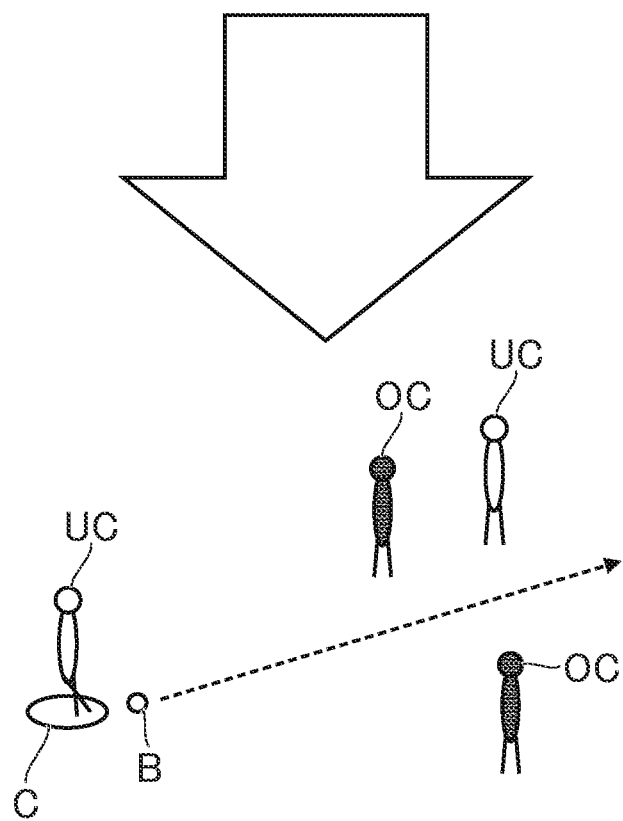

As illustrated in FIG. 7, for example, when the user stops the touch position after performing a swipe operation on the right-side region RA, the user character UC performs a ground through pass in the swipe direction. The swipe operation is, for example, an operation in which the user touches the touch panel 14A, and then while maintaining the touch, moves the touch position in a certain direction. The swipe operation is similar to the above-mentioned slide operation, but the difference is that, in the slide operation, the direction instructed by the user may be changed during the touch, whereas in the swipe operation, the direction instructed by the user does not change during the touch. In the following, the operation illustrated in FIG. 7 is referred to as a swipe stop operation. The ground through pass is, for example, a pass that is performed in a low trajectory to a space in front of a player on the same team. When the user character UC performs a ground through pass, for example, the ball B moves toward a space in front of the receiver while rolling along the pitch PT threading between the opposition players.

Figure 8:
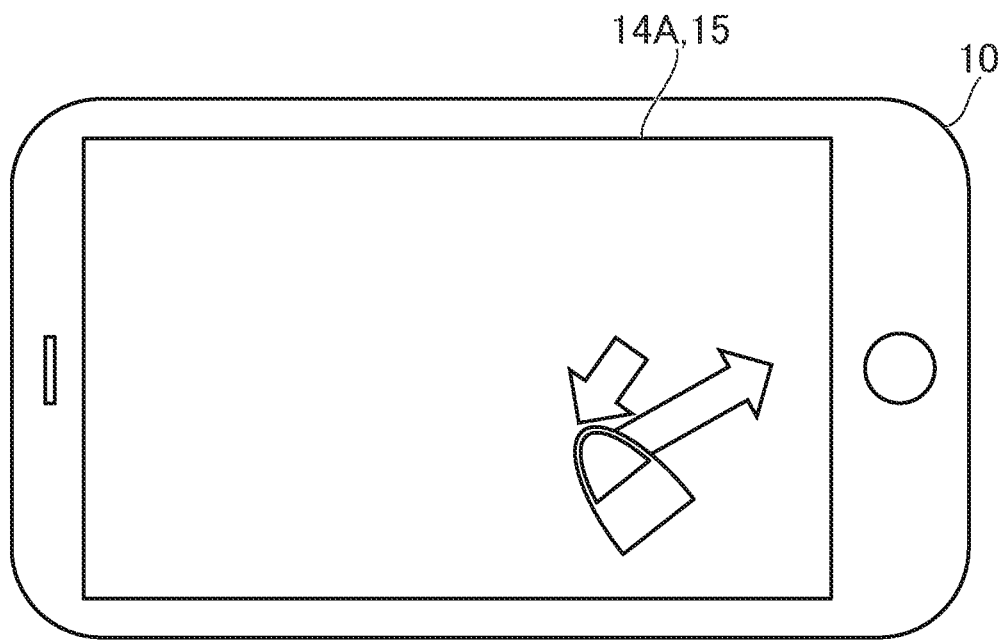
FIG. 8 is a diagram for illustrating an example of an operation on the right-side region during attack.
Figure 8:
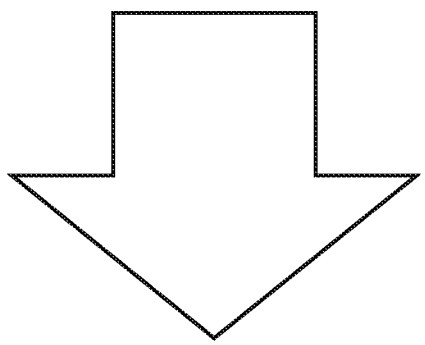
Figure 8:
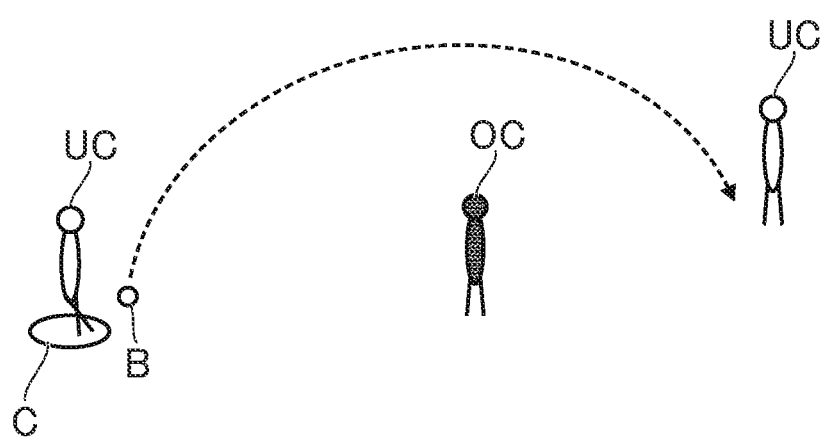

As illustrated in FIG. 8, for example, on the right-side region RA, when the user slightly pulls back in a direction opposite to the direction in which he or she wants to pass and then performs a flick operation in the direction in which he or she wants to pass, the user character UC performs a fly pass. The fly pass is, for example, a pass that is performed in a high trajectory to a player on the same team. When the user character UC performs a fly pass, for example, the ball B moves toward the receiver while rising high in the air. The operation illustrated in FIG. 8 is hereinafter referred to as a pull-flick operation.

Figure 9:
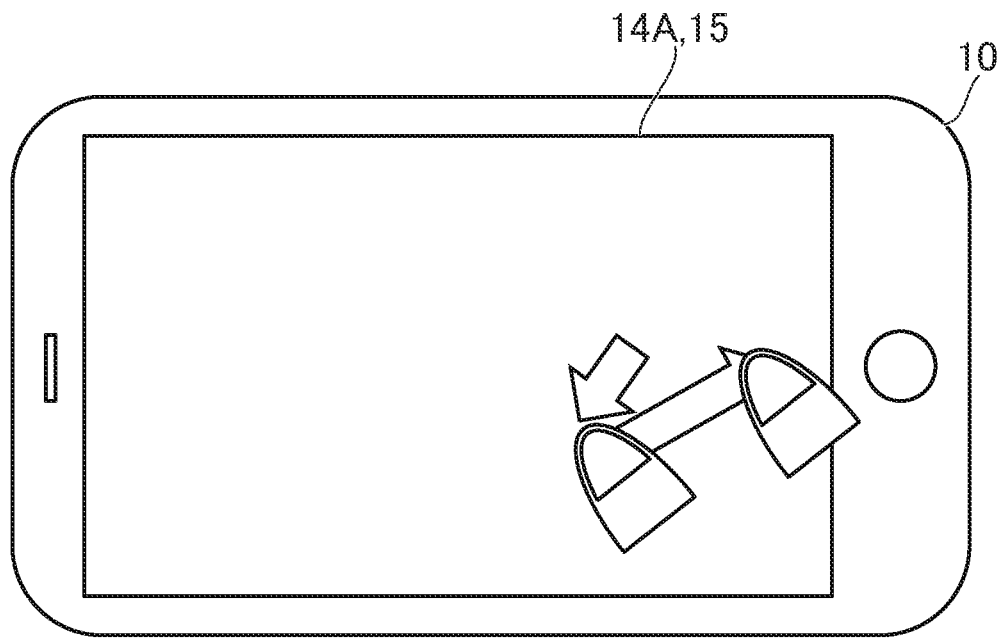
FIG. 9 is a diagram for illustrating an example of an operation on the right-side region during attack.
Figure 9:
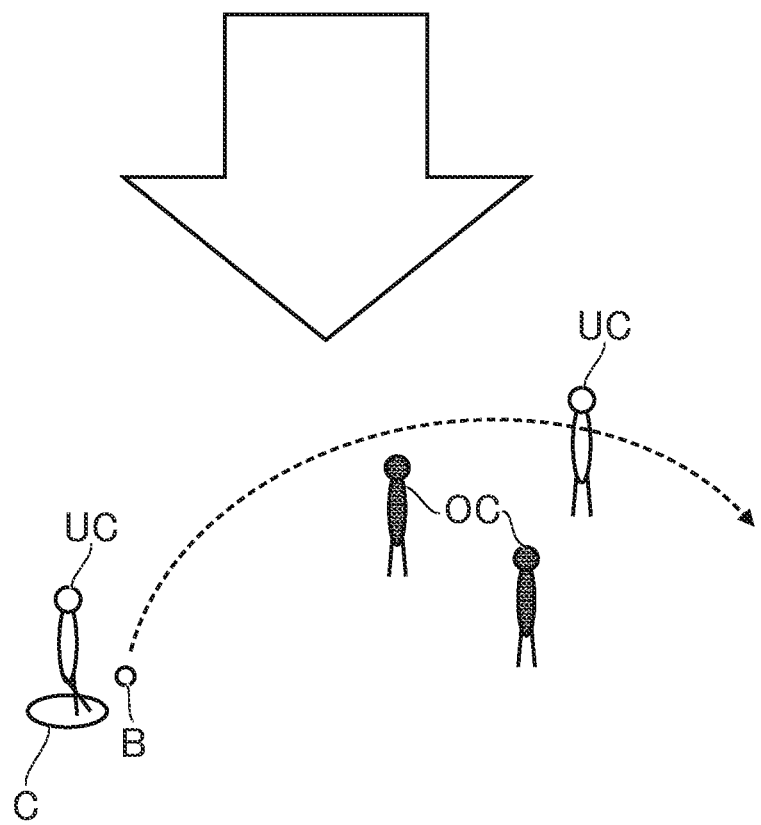

As illustrated in FIG. 9, for example, on the right-side region RA, when the user slightly pulls back in the direction opposite to the direction in which he or she wants to pass, then performs a swipe operation in the direction in which he or she wants to pass, and stops in a touch position, the user character UC performs a fly through pass in the swipe direction. The fly through pass is, for example, a pass that is performed in a high trajectory to a space in front of a player on the same team. When the user character UC performs a fly through pass, for example, the ball B moves over the head of an opposition player toward a space in front of the receiver while rising high in the air. The operation illustrated in FIG. 9 is hereinafter referred to as a pull-swipe stop operation.

The trajectories of the ground pass, the ground through pass, the fly pass, and the fly through pass described above may be determined based on an ability of a kicker. For example, a deviation from an ideal trajectory may be determined based on the ability of the kicker. Example of the ability of the kicker may include a parameter indicating an accuracy of the ground pass and a parameter indicating the accuracy of the fly pass. The operations on the left-side region LA and the right-side region RA are not limited to the examples described above. For example, when the user performs a flick operation on the left-side region LA, the user character UC may perform a feint in the flick direction, and when the user performs a tap operation on the left-side region LA, the user character UC may stop dribbling. The tap operation is, for example, an operation in which a touch is performed on the touch panel 14A and then immediately released. For example, when the user performs a double tap operation on the right-side region RA, the user character UC may shoot. The double tap operation is, for example, an operation in which a tap operation is consecutively performed twice. For example, when the ball B is near the touchline TL and the goal line EL of the opposing team and the user performs a pull-flick operation or a pull-swipe stop operation, the user character UC may perform a centering action.

For example, the user character UC may also perform an action by combining an operation on the left-side region LA and an operation on the right-side region RA. For example, when the user performs a prolonged press operation maintaining a touch on the right-side region RA while the user is performing a slide operation on the left-side region LA, the user character UC may perform dash dribbling, which is faster than normal dribbling. For example, when the user performs a prolonged press operation on the right-side region RA while the user is performing a flick operation on the left-side region LA, the user character UC may perform burst dribbling, which is faster than dash dribbling. For example, when the user performs a flick operation on the left-side region LA immediately after performing any one of the operations of FIG. 6 to FIG. 9 on the right-side region RA, the user character UC may start to run immediately after passing.

In the above description, operations during attack are described as examples, but even during defense, operations may be performed on each of the left-side region LA and the right-side region RA. During defense, the user character UC closest to the opponent character OC in possession of the ball may be set as the operation subject, but the user may also freely switch the operation subject.

For example, when the user performs a slide operation on the left-side region LA, the user character UC moves in the slide direction. For example, when the user performs a prolonged press operation maintaining a touch on the right-side region RA while the user is performing a slide operation on the left-side region LA, the user character UC performs a dash movement, and applies pressure on an opponent character. For example, when the user performs a flick operation on the right-side region RA, the user character UC performs a sliding tackle in the flick direction.

For example, when the user character UC is in possession of the ball B in his or her own half, when the user performs a double tap operation on the right-side region RA while the user is performing a sliding operation on the left-side region LA, the character UC performs a clearing kick. For example, when the user performs a tap operation on the right-side region RA, the user character UC, which serve as the operation subject, is switched. For example, when the user performs a swipe stop operation on the right-side region RA, the user character UC applies pressure in the swipe direction.

As described above, in the first embodiment, various operations are allowed to be performed using the touch panel 14A. In particular, operations that are not available in the related art, such as a pull-flick operation and a pull-swipe stop operation, are allowed to be performed. As a result, in a game using the touch panel 14A, it is possible to increase the types of game processing for which the user can issue an execution instruction. The details of this processing are now described below. In the following, when it is not particularly required to refer to the drawings, the reference symbols of the user character, the ball, and the like are omitted.

1-3. Functions to be Implemented in Game Control Device

Figure 10:
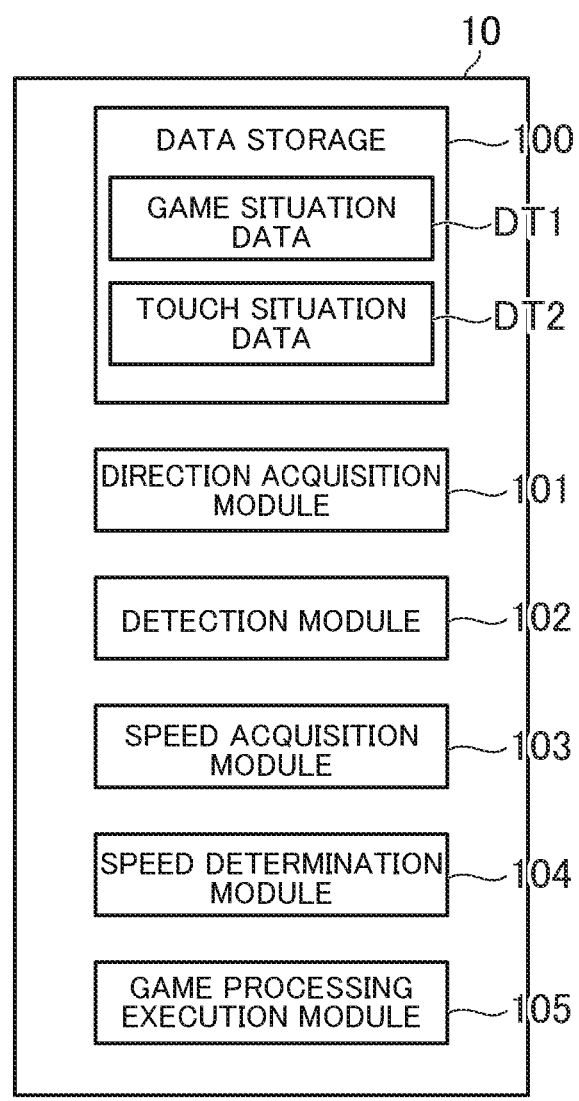
FIG. 10 is a function block diagram for illustrating, of functions implemented in a game control device, functions relating to the present invention.

FIG. 10 is a function block diagram for illustrating, of the functions implemented in the game control device 10, the functions relating to the present invention according to one embodiment of the present invention. In the first embodiment, a data storage 100, a direction acquisition module 101, a detection module 102, a speed acquisition module 103, a speed determination module 104, and a game processing execution module 105 are implemented in the game control device 10.

1-3-1. Data Storage

The data storage 100 is mainly implemented by the storage 12. The data storage 100 stores data required for executing the game. In this description, game situation data DT1 and touch situation data DT2 are described as an example of the data stored in the data storage 100.

Figure 11:
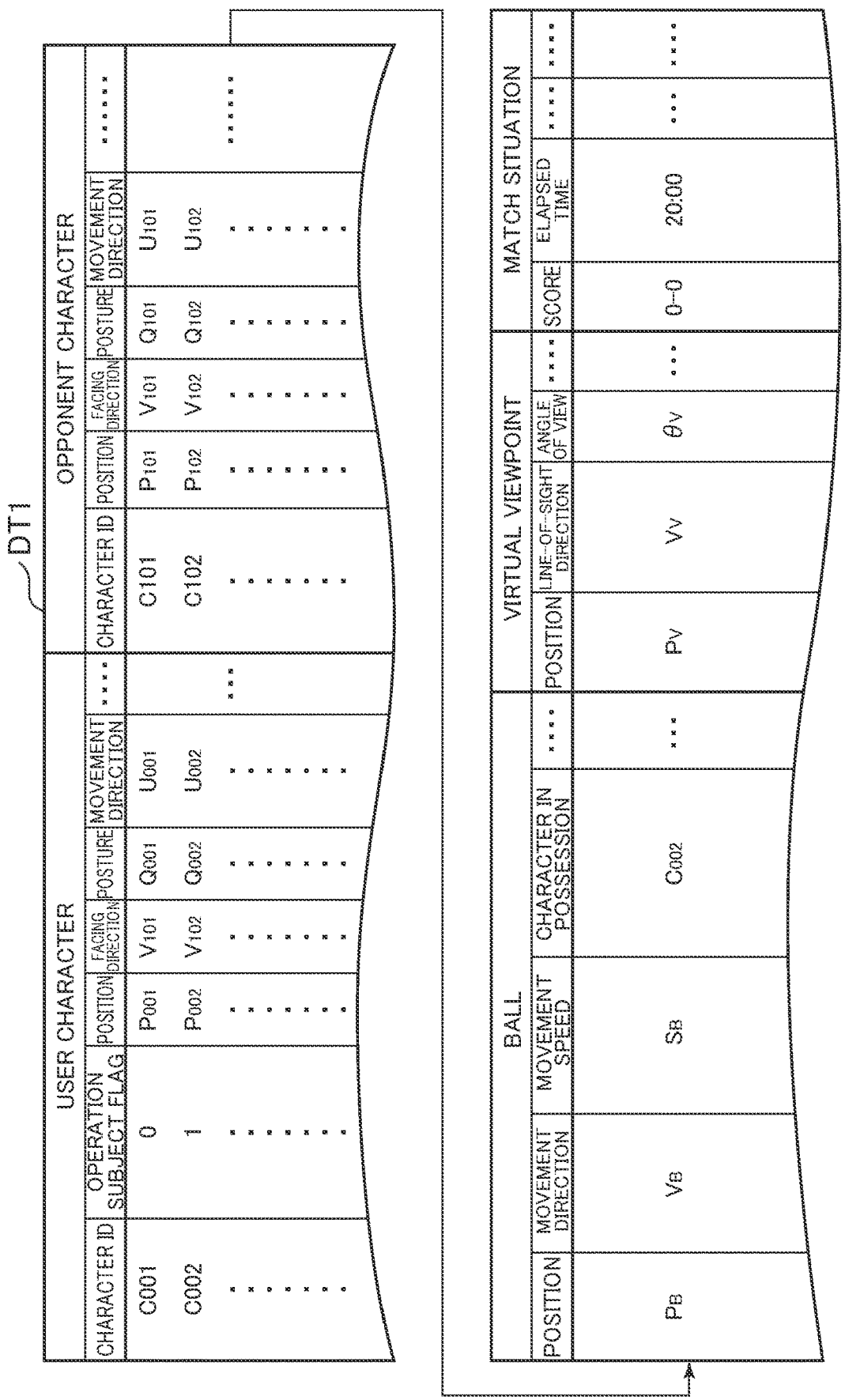
FIG. 11 is a table for showing an example of game situation data.

FIG. 11 is a table for showing an example of the game situation data DT1. As shown in FIG. 11, the game situation data DT1 is data indicating the situation of the game being executed. As shown in FIG. 11, in the game situation data DT1, for example, the situation of the virtual space and the match situation are stored. For example, as the current situation of the virtual space, the state of each character, the state of the ball, and the state of the virtual viewpoint are stored. The game situation data DT1 may be appropriately updated during execution of the game, and a history game situation data DT1 may be accumulated in the data storage 100.

For example, as the state of each character, a position, a facing-direction, a posture, a movement direction, and the like are stored in association with a character ID uniquely identifying each user character and opponent character. An operation subject flag identifying the user character set as the operation subject may also be stored in the game situation data DT1. For example, as the state of the ball, the position, movement direction, and movement speed of the ball, the character in possession of the ball, and the like are stored. For example, as the state of the virtual viewpoint, information on the position of the virtual viewpoint, the line-of-sight direction, an angle of view, and the like may be stored. As the match situation, a score of the user team, a score of the opposing team, an elapsed time of the match, and the like are stored.

FIG. 12 is a table for showing an example of the touch situation data DT2. As shown in FIG. 12, the touch situation data DT2 is data indicating a history of the operations performed by the user via the touch panel 14A. As shown in FIG. 12, for example, a touch position history, a base position, a pass input start flag, and a pull operation flag are stored in the touch situation data DT2. Examples of touch position histories that maybe stored include a touch position history from the start of the match until the present time point, and a touch position history from after the touch started until the touch is released. The base position is a touch position to serve as a reference for determining the movement direction of the ball. For example, any touch position after the start of the touch may be stored as the base position.

The pass input start flag is information identifying whether or not an operation input for passing has been performed on the right-side region RA. For example, when the flag is on, this indicates that an operation input for passing has started, and when the flag is off, this indicates that an operation input for passing has not started. As described later, in the first embodiment, the pass input start flag is turned on when the movement speed of the touch position reaches a reference speed or more.

The pull operation flag is information identifying whether or not a pull-flick operation or a pull-swipe stop operation is currently being input. For example, when the flag is on, this indicates that a pull-flick operation or a pull-swipe stop operation is being executed, and when the flag is off, this indicates that a pull-flick operation or a pull-swipe stop operation is not being executed. As described below, in the first embodiment, the pull operation flag is turned on when the angle between the movement direction of the touch position in a case where the pass input start flag is turned on and the movement direction of the touch position afterward reaches a reference angle or more.

The data stored in the data storage 100 is not limited to the example described above. The data storage 100 is only required to store data required for executing the game. For example, the data storage 100 may store motion data defining an action by a character, and data indicating a relationship between operation details and the action of the character. For example, the data storage 100 may store data (e.g., coordinate data representing a position, such as a boundary or an edge portion) identifying the left-side region LA and the right-side region RA.

1-3-2. Direction Acquisition Module

The direction acquisition module 101 is mainly implemented by the controller 11. The direction acquisition module 101 acquires, when the touch position moves while the touch panel is being touched, the movement direction of the touch position. The movement direction is, for example, the direction in which the touch position has changed. For example, the movement direction is a vector connecting a touch position at a certain time point and a touch position at a time point after that certain time point. The movement direction may be acquired at any timing, but may also be acquired each time interval determined based on the frame rate, for example. In this case, the movement direction may be acquired every frame, or may be acquired each time a predetermined frame elapses.

For example, the direction acquisition module 101 acquires the movement direction of the touch position based on the touch position history stored in the touch situation data DT2. For example, the direction acquisition module 101 acquires the movement direction of the touch position based on the touch position at a certain time point (e.g., current frame) and the touch position at a time point earlier than that certain touch position (e.g., previous frame). For example, the direction acquisition module 101 acquires a vector connecting those two touch positions as the movement direction. The movement direction is only required to be acquired based on the positional relationship between touch positions at each of a plurality of time points, and those time points may be shifted by a number of frames.

1-3-3. Detection Module

The detection module 102 is mainly implemented by the controller 11. The detection module 102 detects that the movement direction acquired by the direction acquisition module 101 has changed to any movement direction, which is an angle formed of a predetermined angle or more with respect to the movement direction acquired at a predetermined timing.

The predetermined timing is, for example, any time point after the touch is started. For example, the predetermined timing is any timing during a period from after the touch is started until before the touch is released or before the movement of the touch position stops or almost stops. For example, the predetermined timing is, when the detection module 102 executes determination processing every frame, the movement direction at a time point a predetermined period before the current time point. In the first embodiment, there is described a case in which the timing at which the movement speed of the touch position reaches a reference speed or more corresponds to the predetermined timing.

The formed angle is, for example, an intersection angle of two vectors. The predetermined angle may be an angle determined in advance, for example, 90 degrees. The any movement direction means that any direction may be used as long as the direction formed with respect to the movement direction at the predetermined timing is the predetermined angle or more.

Figure 13:
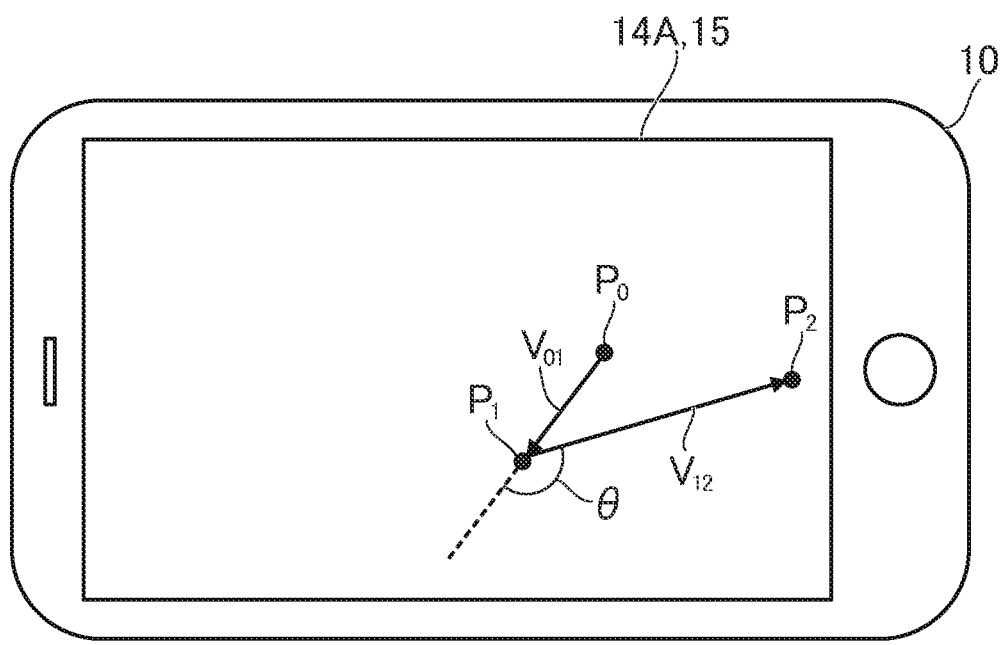
FIG. 13 is a diagram for illustrating a change in a movement direction of a touch position.

FIG. 13 is a diagram for illustrating a change in the movement direction of the touch position. As illustrated in FIG. 13, a touch position at a certain time point $t_0$ is set as $P_0$, a touch position at a later time point $t_1$ is set as $P_1$, and a touch position at an even later time point $t_2$ is set as $P_2$. The movement direction of the touch positions at the time point $t_0$ to time point $t_1$ is $V_{01}$, and the movement direction of the touch positions at the time point $t_1$ to time point $t_2$ is $V_{12}$. The detection module 102 acquires an angle $\theta$ formed by the movement directions $V_{01}$ and $V_{12}$ by calculating the inner product of the movement directions $V_{01}$ and $V_{12}$. The detection module 102 determines whether or not the acquired angle $\theta$ is equal to or more than the predetermined angle. In the first embodiment, the movement direction $V_{01}$ is the movement direction in a case where it is determined by the speed determination module 104 (described later) that the movement speed of the touch position is the reference speed or more. The movement direction $V_{12}$ may be a movement direction acquired every frame by the direction acquisition module 101.

1-3-4. Speed Acquisition Module

The speed acquisition module 103 is mainly implemented by the controller 11. The speed acquisition module 103 acquires the movement speed of the touch position when the touch position moves while the touch panel 14A is being touched. The movement speed is, for example, a movement speed per unit time (e.g., predetermined frame). For example, the direction acquisition module 101 acquires the movement speed of the touch position based on the touch position history stored in the touch situation data DT2.

For example, the direction acquisition module 101 acquires the movement speed of the touch position based on a distance between the touch position at a certain time point (e.g., current frame) and the touch position at a time point earlier than that certain touch position (e.g., previous frame). For example, the direction acquisition module 101 may use the distance between those two touch positions as the movement speed as it is, or may use a value obtained by dividing the distance by the time interval of each of the two touch positions as the movement speed.

1-3-5. Speed Determination Module

The speed determination module 104 is mainly implemented by the controller 11. The speed determination module 104 determines whether or not the movement speed acquired by the speed acquisition module 103 is the reference speed or more. The reference speed is only required to be a speed determined in advance. As described above, in the first embodiment, the predetermined timing at which the direction acquisition module 101 acquires the movement direction is the movement direction in a case where it is determined by the speed determination module 104 that the movement speed is the reference speed or more.

1-3-6. Game Processing Execution Module

The game processing execution module 105 is mainly implemented by the controller 11. The game processing execution module 105 executes first game processing based on the movement direction acquired by the direction acquisition module 101. The game processing execution module 105 also executes, when a change in the movement direction is detected by the detection module 102, second game processing based on the movement direction before the change or after the change.

The game processing is, for example, processing to be executed in accordance with a user operation. For example, the operation details and the type of the game processing are associated with each other in advance. For example, the game processing may be processing in which the result changes depending on the movement direction of the touch position. For example, the game processing may be processing of moving a moving object in the movement direction. In the first embodiment, there is described a case in which a ball is an example of the moving object, but the moving object may be any object arranged in the virtual world, for example, and may be a character.

The first game processing and the second game processing are only required to be different types of game processing, for example. Specifically, the first game processing and the second game processing are only required to be processing in which, for example, the results of the game processing are different. In the first embodiment, there is described a case in which the first game processing and the second game processing are each processing in which the operation subject moves the moving object in the virtual world, and the details of the processing are different.

For example, the first game processing is processing of moving a ball in the virtual world based on the movement direction acquired by the direction acquisition module 101. For example, the second game processing is processing of moving the ball in the virtual world in a different manner from the first game processing. The manner of movement is the trajectory, speed, or rotation of the ball. The trajectory is, for example, the locus along which the ball passes, and is a history of position changes in the horizontal direction and the vertical direction. The rotation is, for example, a rotation direction or a rotation amount. For example, as in the first embodiment, when the game processing is processing of moving the ball, the manner of movement of the ball is different between the first game processing and the second game processing.

The meaning of the first game processing and the second game processing is as described above. In the first embodiment, as an example, there is described a case in which the first game processing is a ground pass or a ground through pass and the second game processing is a fly pass. As mentioned above, a ground pass, a ground through pass, and a fly pass are passes having at least different trajectories.

The above-mentioned term "before the change" refers to, for example, a time point at which the movement direction changes or a time point before the change. For example, "before the change" may be immediately after a touch is started, or may be the above-mentioned predetermined timing. The term "after the change" refers to, for example, a time point at which the movement direction changes, or a time point after the change. For example, "after the change" may be immediately before the touch is released, or may be just before the touch has stopped or almost stopped. In the first embodiment, the game processing execution module executes game processing based on the movement direction after the change.

For example, a pull-flick operation is detectable in the first embodiment, and thus the game processing execution module 105 executes, when a change in the movement direction has been detected by the detection module 102, a fly pass in response to the fact that the touch on the touch panel 14A is released. More specifically, the game processing execution module 105 executes a fly pass based on the release of the touch in the pull-flick operation.

For example, the game processing execution module 105 may also execute, when a change in the movement direction is detected by the detection module 102, a fly pass based on the distance between the touch position serving as the starting point of the movement direction after the change and the touch position in a case where the touch on the touch panel 14A is released. The starting point is, for example, the starting point in a case where the movement direction of the touch position has changed, and may be the position at which the movement direction has switched. For example, the game processing execution module 105 weakens a strength of a kick when the distance is shorter, and increases the strength of the kick when the distance is longer. When the strength of the kick is weak, the speed of the ball becomes slower and the movement distance becomes shorter. When the strength of the kick is strong, the speed of the ball becomes faster and the movement distance becomes longer. For example, the game processing execution module 105 determines a target position of the ball based on the strength of the kick.

For example, a pull-swipe stop operation is capable of being performed in the first embodiment, and thus the game processing execution module 105 executes, when a change in the movement direction is detected by the detection module 102, third game processing in response to the movement of the touch position having stopped or almost stopped. The meaning of game processing is as described above. The third game processing is only required to be different from the first game processing and the second game processing. In the first embodiment, there is described a case in which the third processing is a fly through pass. As described above, a fly through pass has at least a different trajectory of the ball from the other passes.

The term "stopped" refers to, for example, having no change in the touch position even after a predetermined frame elapses. The term "almost stopped" refers to, for example, the fact that a change amount of the touch position in a predetermined frame is less than a threshold value. The game processing execution module 105 executes a fly through pass based on the touch in the pull-flick operation having stopped or almost stopped.

For example, the game processing execution module 105 executes, when a change in the movement direction is detected by the detection module 102, a fly through pass based on a distance between the touch position serving as the starting point of the movement direction after the change and the touch position after the movement of the touch position has stopped or almost stopped. The meaning of the starting point is the same as described above. The game processing execution module 105 weakens the strength of the kick when the distance is shorter, and strengthens the strength of the kick when the distance is longer. The game processing execution module 105 determines the target position of the ball based on the strength of the kick.

The game processing of the various passes described above may be executed at any timing, but in the first embodiment, it is assumed that the game processing execution module 105 executes the game processing based on the movement direction acquired while the operation subject is in possession of the ball or before the operation subject touches the ball. In this description, "while the operation subject is in possession of the ball" refers to a situation in which the ball is in the vicinity of the operation subject, and the operation subject is in control of the movement of the ball. In the first embodiment, this is a period during which a possession flag is associated with the operation subject. The period "before the operation subject touches the ball" is, for example, a period from a predetermined time before a time point at which the operation subject touches the ball until that time point.

For example, the game processing execution module 105 may execute the first game processing based on the movement direction acquired during a period in which the operation subject is in possession of the ball or within a period before the operation subject touches the ball. For example, the game processing execution module 105 may also execute the second game processing based on the movement direction acquired during a period in which the operation subject is in possession of the ball or within a period before the operation subject touches the ball. In other words, even when the direction acquisition module 101 acquires the movement direction, the game processing execution module 105 does not execute game processing during a period other than a period in which the operation subject is in possession of the ball or within a period before the operation subject touches the ball.

1-4. Processing to be Executed in Game Control Device

Figure 14:
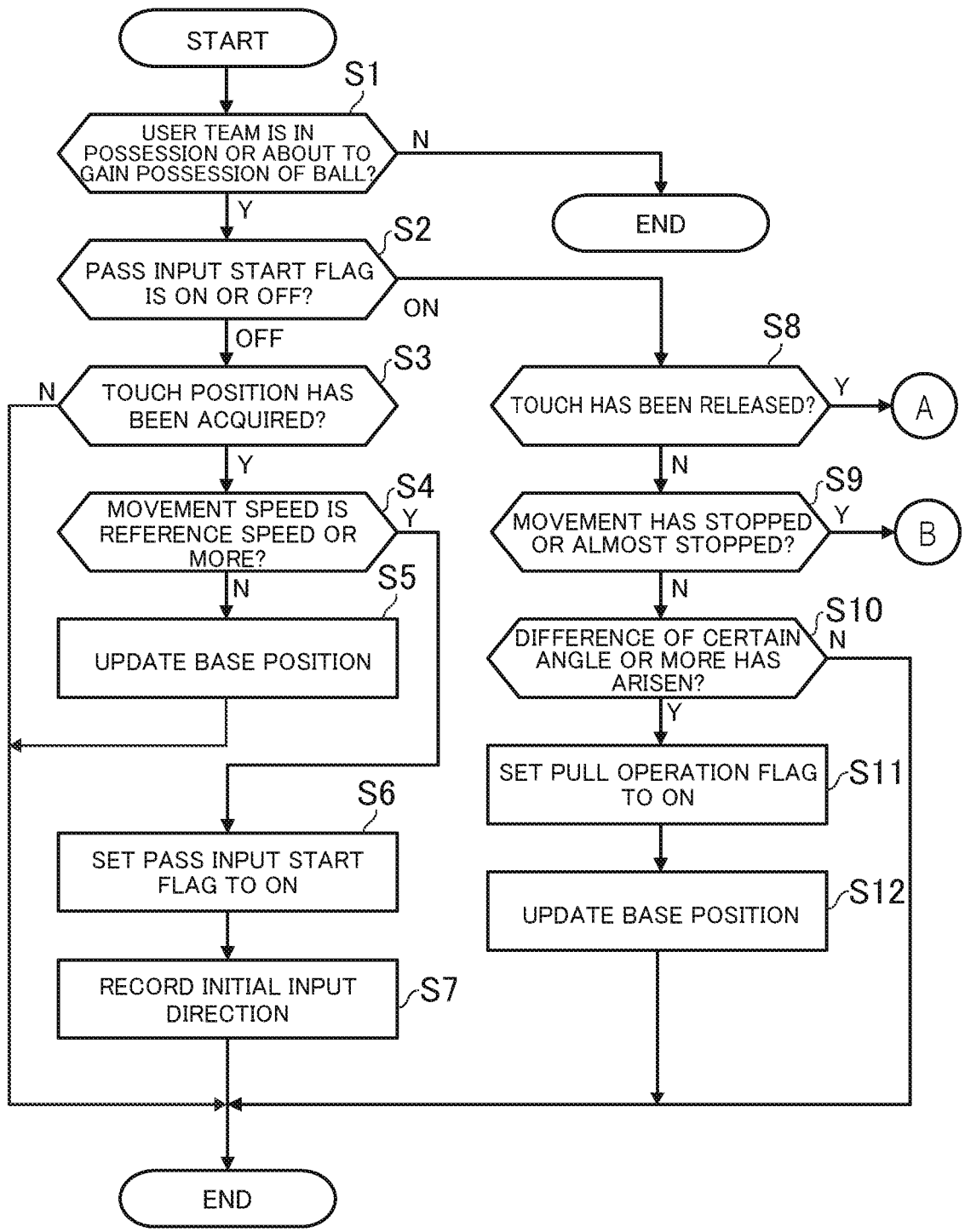
FIG. 14 is a flowchart for illustrating an example of processing to be executed in the game control device.
Figure 15:
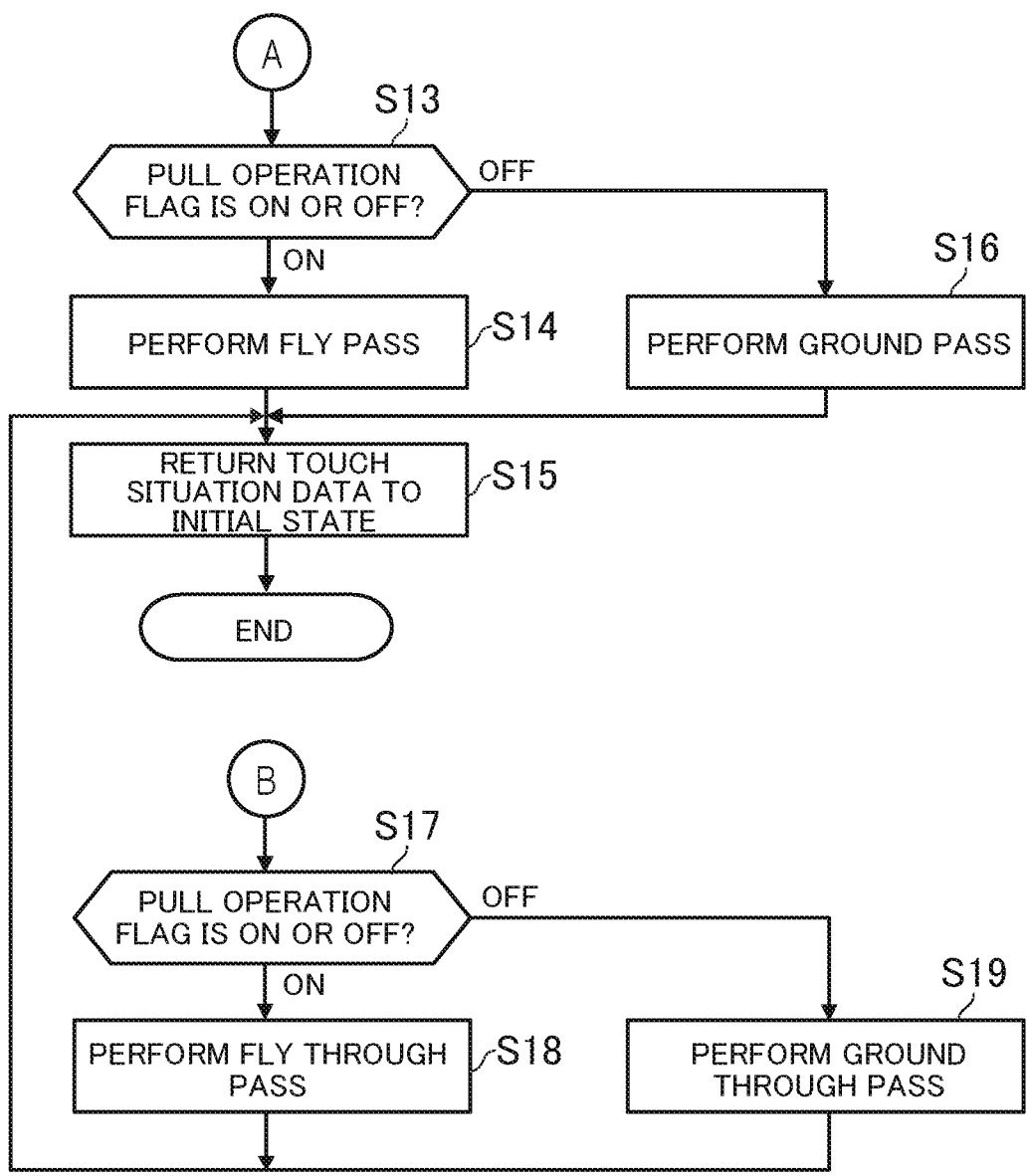
FIG. 15 is a flowchart for illustrating an example of processing to be executed in the game control device.

FIG. 14 and FIG. 15 are flowcharts for illustrating an example of processing to be executed in the game control device 10. In this description, of the processing relating to the game, there is described the processing of detecting a flick operation, a swipe operation, a pull-flick operation, and a pull-swipe stop operation during attack by the user team. In the game control device 10, other processing may be executed. For example, processing of updating the game situation data DT1, processing of detecting another operation during attack, processing of detecting an operation during defense, and the like may be executed.

The processing illustrated in FIG. 14 is executed by the controller 11 operating in accordance with programs stored in the storage 12. The processing described here is an example of the processing by each of the function blocks illustrated in FIG. 10. For example, the following processing is executed each time interval (e.g., ⅟30 seconds) determined based on a predetermined frame rate.

As illustrated in FIG. 14, first, the controller 11 determines, based on the game situation data DT1, whether or not the user team is in possession, or about to gain possession, of the ball (Step S1). In Step S1, for example, the controller 11 determines whether or not the user team is in possession of the ball by looking up the character in possession of the ball stored in the game situation data DT1, and determining whether or not the user character is in possession of the ball. For example, the controller 11 may determine whether or not the user team is about to gain possession of the ball by looking up the position and the movement direction of the ball stored in the game situation data DT1, and determining whether or not the ball is moving toward the user character and whether or not the distance between the user character and the ball is less than a threshold value. Further, for example, the controller 11 may determine whether or not the user team is about to gain possession of the ball by determining whether or not, under a loose ball state, namely, a state in which nobody is in possession of the ball, the operation subject is running after the ball. Further, for example, the controller 11 may also determine whether or not the user team is about to gain possession of the ball by determining whether or not the operation subject is competing with an opponent character for a fly pass ball from the opposing team or the like.

When it is not determined that the user team is in possession, or about to gain possession, of the ball (Step S1: N), the user team cannot move the ball, and thus this processing is ended. On the other hand, when it is determined that the user team is in possession, or about to gain possession, of the ball (Step S1: Y), the controller 11 looks up the pass input start flag stored in the touch situation data DT2 (Step S2). The initial value of the pass input start flag is off. When it is determined that the pass input start flag is off (Step S2: OFF), the controller 11 determines, based on the detection signal of the touch panel 14A, whether or not a touch position has been acquired (Step S3).

When it is not determined that a touch position has been acquired (Step S3: N), the user is not performing an operation, and thus this processing is ended. On the other hand, when it is determined that a touch position has been acquired (Step S3: Y), the controller 11 stores the touch position in the touch situation data DT2, and determines whether or not the movement speed of the touch position is the reference speed or more (Step S4). In Step S4, the controller 11 determines, for example, whether or not the movement speed as measured by the distance between the touch position in the most recent frame and the latest touch position acquired in S3 is the reference speed or more. Specifically, for example, the controller 11 determines whether or not the touch position has moved by a predetermined number of pixels or more per frame. The reference speed is stored in advance in the storage 12, and may be a fixed value or a variable value.

When it is determined that the movement speed is not the reference speed or more (Step S4: N), the controller 11 updates the base position stored in the touch situation data DT2 (Step S5), and ends this processing. In Step S5, the controller 11 stores the touch position obtained in Step S3 as the base position stored in the touch situation data DT2. A base position has not yet been stored when the user has just touched the touch panel 14A, and thus in this case, the controller 11 stores the touch position obtained in Step S3 as the initial value of the base position. The reason for updating the base position is because the touch position may gradually shift even when the user is intended to maintain a fixed touch position, and the base position is set to the latest touch position in such a case.

On the other hand, when it is determined in Step S4 that the movement speed is the reference speed or more (Step S4: Y), the controller 11 looks up the touch situation data DT2, sets the pass input start flag to on (Step S6), records an initial input direction (Step S7), and ends this processing. In Step S7, the controller 11 acquires, for example, a vector between the touch position in the most recent frame and the latest touch position acquired in Step S3, and stores the acquired vector in the storage 12 as the initial input direction.

In Step S2, when it is determined that the pass input start flag is on (Step S2: ON), this indicates that the touch panel 14A has been touched in the most recent frame, and thus the controller 11 determines, based on the detection signal of the touch panel 14A, whether or not the touch has been released (Step S8). In Step S8, the controller 11 determines whether or not a signal indicating the touch position has been received from the touch panel 14A.

When it is not determined that the touch has been released (Step S8: Y), that is, when the touch on the touch panel 14A is maintained, the controller 11 determines, based on the touch situation data DT2, whether or not the movement of the touch position has stopped or almost stopped (Step S9).

In Step S9, the controller 11 acquires, as the movement speed of the touch position, for example, the movement speed measured based on the distance between the touch position in the most recent frame and the latest touch position acquired in Step S3. Then, the controller 11 determines whether or not the acquired movement speed is the reference speed or more.

When it is not determined that the movement of the touch position has stopped or almost stopped (Step S9: N), the controller 11 determines, based on the touch situation data DT2, whether or not a difference of a certain angle or more has arisen between the movement direction of the current touch position and the initial movement direction (Step S10). In Step S10, the controller 11 acquires, as the movement direction of the current touch position, for example, the vector between the touch position in the most recent frame and the latest touch position acquired in Step S3. Then, the controller 11 acquires the angle between the acquired movement direction and the initial movement direction, and determines whether or not the acquired angle is equal to or more than the threshold value.

When it is not determined that a difference of a certain angle or more has arisen (Step S10: N), this means that the touch is still maintained, and hence this processing is ended without performing any particular pass action. On the other hand, when it is determined that a difference of a certain angle or more has arisen (Step S10: Y), the controller 11 looks up the touch situation data DT2, sets the pull operation flag to on (Step S11), updates the base position (Step S12), and ends this processing. In Step S12, the controller 11 stores the touch position acquired in Step S3 as the base position stored in the touch situation data DT2.

On the other hand, when it is determined in Step S8 that the touch has been released (Step S8: Y), the processing advances to processing illustrated in FIG. 15, and the controller 11 looks up the pull operation flag stored in the touch situation data DT2 (Step S13). When the pull operation flag is on (Step S13: ON), this means that a pull-flick operation has been performed, and thus the controller 11 causes the user character of the operation subject to perform a fly pass (Step S14), returns the touch situation data DT2 to its initial state (Step S15), and ends this processing.

In Step S14, the controller 11 looks up the touch situation data DT2, and determines the strength of the kick by the operation subject based on the distance between the base position and the touch position immediately before the touch is released. Then, the controller 11 determines the movement direction of the ball based on those vectors. The controller 11 determines the trajectory of the ball based on a physics calculation algorithm defined for a fly pass relating to the determined kick strength and movement direction. Then, the controller 11 plays back the motion data defined for the fly pass to cause the operation subject to perform a fly pass action, and moves the ball along the determined trajectory. In Step S15, the processing may be performed such that only the respective flags are returned to their initial values while maintaining the touch position history, or such that all of the pieces of information in the touch situation data DT2 are returned to their initial values.

On the other hand, when the pull operation flag is off (Step S13: OFF), because this means that a flick operation has been performed, the controller 11 causes the user character of the operation subject to perform a ground pass (Step S16), and advances the processing to Step S15. In Step S16, the processing by the controller 11 of determining the kick strength and the movement direction of the ball, playing back the motion data, and causing the operation subject to perform a ground pass, may be the same as the processing in Step S14.

On the other hand, when it is determined in Step S9 that the movement of the touch position has stopped or almost stopped (Step S9: Y), the controller 11 looks up the pull operation flag stored in the touch situation data DT2 (Step S17). When the pull operation flag is on (Step S17: ON), this means that a pull-swipe stop operation has been performed, and thus the controller 11 causes the user character of the operation subject to perform a fly through pass (Step S18), and advances the processing to Step S15. In Step S18, the processing by the controller 11 of determining the kick strength and the movement direction of the ball, playing back the motion data, and causing the operation subject to perform a fly ground pass, may be the same as the processing in Step S14.

On the other hand, when the pull operation flag is off (Step S17: OFF), this means that a swipe stop operation has been performed, and thus the controller 11 causes the user character of the operation subject to perform a ground through pass (Step S19), and ends this processing. In Step S19, the processing by the controller 11 of determining the kick strength and the movement direction of the ball, playing back the motion data, and causing the operation subject to perform a ground through pass, may be the same as the processing in Step S14.

According to the game control device 10 described above, when it is detected that the movement direction of the touch position has changed to any movement direction having an angle of a predetermined angle or more formed with respect to the movement direction acquired at a predetermined timing, such as in the case of a pull-flick operation or a pull-swipe stop operation, the game processing to be executed (type of a pass in this case) changes, which can increase the types of game processing for which the user can issue an instruction. More specifically, it is possible to perform an operation of turning back the movement direction of the touch position, which enables new operations different from a simple flick operation, a swipe operation, and the like to be provided. As a result, the types of operations in a game using the touch panel 14A can be increased. The distinction from operations such as a flick operation and a swipe operation is clarified by employing a condition that the difference in the angle in a case where the touch direction is turned back is equal to or more than the predetermined angle, which enables the operation to be easily understood by the user. The determination method is clearly different from a flick operation, a swipe operation, and the like, and thus the game control device 10 can be prevented from erroneously recognizing the above-described operation as a flick operation, a swipe operation, or the like. For example, when porting a game developed for consumer game machines to a smartphone or the like, operability for a user who is accustomed to the consumer game machine version of the game is improved by implementing the same operations as the operations used on a game controller having physical buttons or levers on the touch panel 14A of the smartphone or the like. However, there are no physical buttons or levers on the touch panel 14A, for example, in order to implement the same operations as a game controller, and thus it is required to devise the touch operations. In this regard, in the first embodiment, various operations such as a pull-flick operation and a pull-swipe stop operation can be implemented, and thus the operability can be brought closer to that of a consumer game machine by, for example, ensuring the variety of operations.

The user may also be provided with a new operation, like a pull-flick operation, in which the movement direction of the touch position is changed to any movement direction having an angle of a predetermined angle or more formed with respect to the movement direction acquired at a predetermined timing, and then the touch is released.

With the pull-flick operation, there may be provided a new operation in which, by executing game processing based on the distance between the touch position (base position) serving as the starting point of the movement direction after the change and the touch position in a case where the touch is released, the details of the game processing (in this case, strength of kick) are instructed by adjusting that distance. For example, when the strength of the action by the character (e.g., strength of kick) is set to be stronger as the distance is longer, a strong correlation is produced between the distance and the strength, which allows an intuitive action to be performed.

The user may also be provided with a new operation, like a pull-swipe stop operation, in which the movement direction of the touch position is changed to any movement direction having an angle of a predetermined angle or more formed with respect to the movement direction acquired at a predetermined timing, and then the movement of the touch position is stopped or almost stopped.

With the pull-swipe stop operation, there may be provided a new operation in which, by executing game processing based on the distance between the touch position serving as the starting point of the movement direction after the change and the touch position in a case where the movement of the touch position is stopped or almost stopped, the details of the game processing (in this case, strength of kick) are instructed by adjusting that distance. For example, when the strength of the action by the character (e.g., strength of kick) is set to be stronger as the distance is longer, a strong correlation is produced between the distance and the strength, which allows an intuitive action to be performed.

For example, when an operation is performed in which the touch on the touch panel 14A is continued, the touch position may naturally shift during the game play. However, in the pull-flick operation or the pull-swipe stop operation, the movement direction serves as the reference in a case where the movement speed of the touch position is the reference speed or more, and thus a fly pass or a fly through pass can be executed when the user performs the operation according to the present invention with a clear intention. Therefore, as described above, even when the touch position is naturally shifted during game play, it is possible to prevent a determination that a pull-flick operation or a pull-swipe stop operation has been performed.

The trajectory of a ground pass and a ground through pass is different from the trajectory of a fly pass and a fly through pass, and as a result, it is possible to provide various operations capable of indicating the manner of movement of the ball.

Applying a pull-flick operation or a pull-swipe stop operation to a game in which the operation subject moves the ball as in the first embodiment can increase the types of operation the operation subject uses to move the ball. Enabling a fly pass or a fly through pass to be executed based on the movement direction acquired during the period before the operation subject touches the ball allows the operation to be performed in advance, which enables the operation subject move the ball immediately after touching the ball.

2. Second Embodiment

Next, another embodiment of the present invention is described. In a second embodiment of the present invention, a game similar to the first embodiment can be executed, and a description of components similar to those of the first embodiment is omitted.

2-1. Outline of Processing in Second Embodiment

In the second embodiment, as an example, there is described processing in which the opposing team has fouled and the user team acquires a free kick. A free kick is, when a foul has occurred during the match, a kick in which play is restarted from the place where the foul has occurred without interference by the opposing team members. In a free kick, a set play may be performed in which the user character tries to shoot by coming into contact with a kicked ball, or a set play may be performed in which the user character directly aims a kick at the goal. For example, when a user team acquires a free kick, the virtual viewpoint VC switches.

Figure 16:
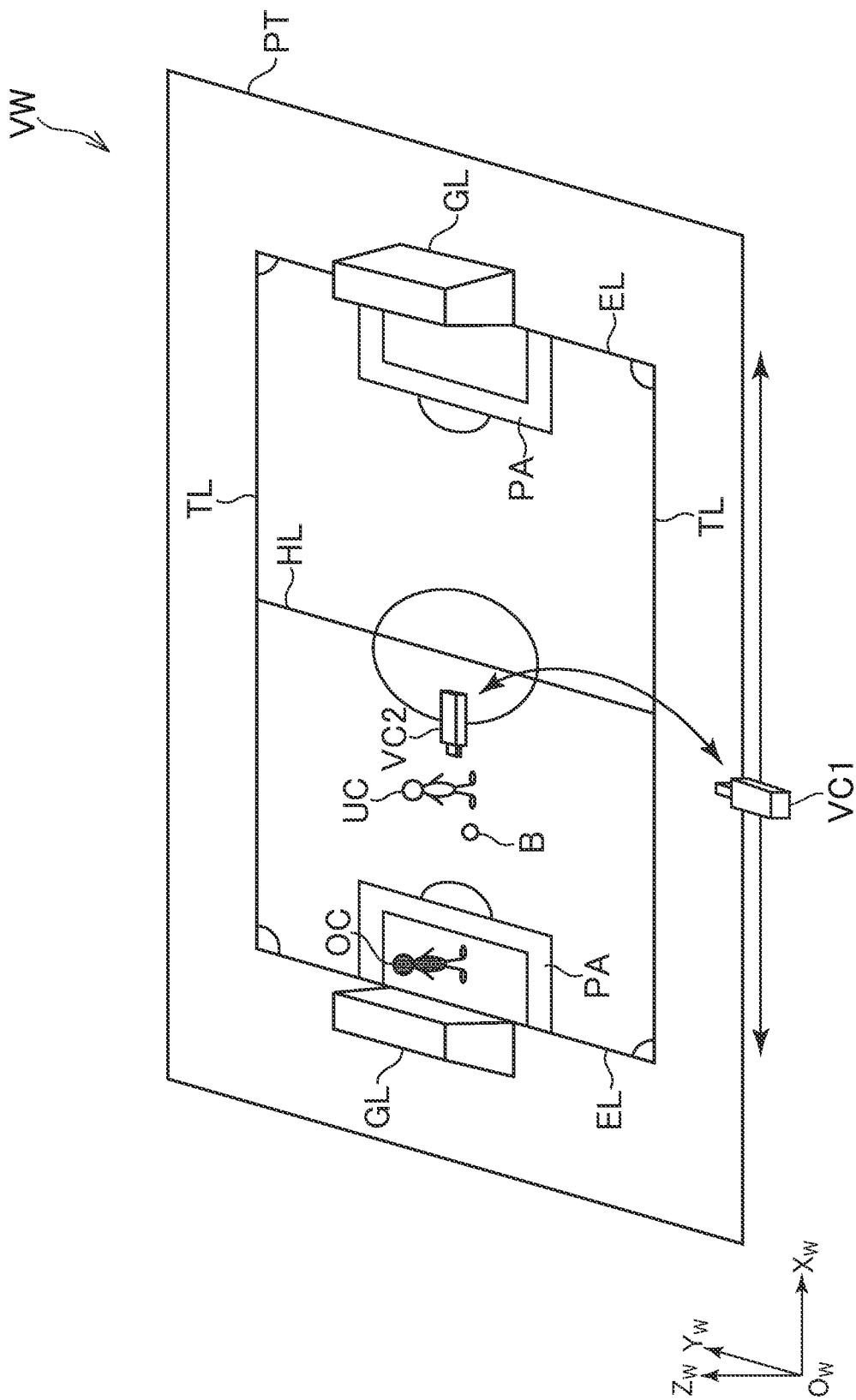
FIG. 16 is a diagram for illustrating a switch in a virtual viewpoint.

FIG. 16 is a diagram for illustrating a switch in the virtual viewpoint. As illustrated in FIG. 16, before the user team acquires a free kick (i.e., an in-play state in which match is progressing), the virtual viewpoint is an overhead viewpoint VC1 looking down on the pitch PT obliquely from above. In the case of the overhead viewpoint VC1, the virtual viewpoint is maintained at a predetermined distance or more from the pitch PT, and an angle between the line-of-sight direction and the pitch PT is maintained at a predetermined angle or more. The virtual world image G1 in a case where the virtual viewpoint is the overhead viewpoint VC1 is in the state described with reference to FIG. 3.

On the other hand, when the user team acquires a free kick, the virtual viewpoint switches to a viewpoint (hereinafter referred to as rear viewpoint VC2) that is closer to the user character UC kicking the ball B and views the ball B from behind the user character UC. In the case of the rear viewpoint VC2, the virtual viewpoint is maintained at less than the predetermined distance from the pitch PT, and the angle between the line-of-sight direction and the pitch PT is maintained at less than the predetermined angle.

Figure 17:
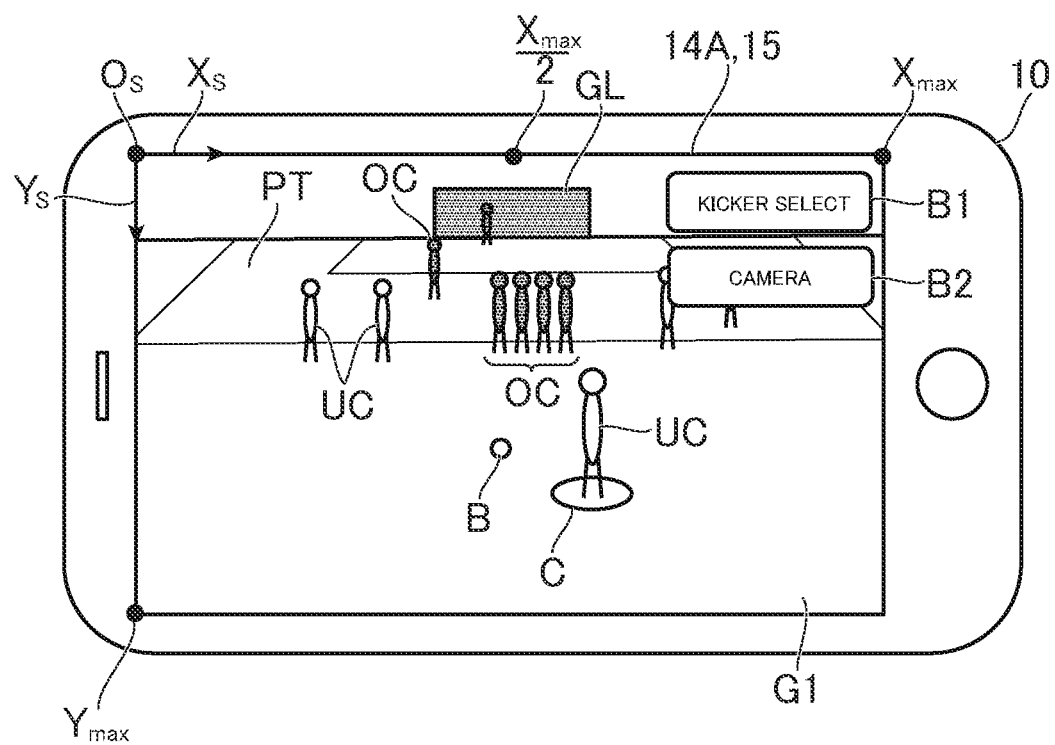
FIG. 17 is a diagram for illustrating an example of the virtual world image in a case where the virtual viewpoint is a rear viewpoint.

FIG. 17 is a diagram for illustrating an example of the virtual world image G1 in a case where the virtual viewpoint is the rear viewpoint VC2. As illustrated in FIG. 17, in the rear viewpoint VC2, the virtual viewpoint is set closer to the user character UC (i.e., operation subject) who is the kicker, and thus the various objects such as the pitch PT, the user character UC, the opponent character OC, the ball B, and the goal GL are displayed larger than when the virtual viewpoint is the overhead viewpoint VC1. The kicker is the person who is going to kick the free kick.

When the user team acquires a free kick, a kicker change button B1 for changing the kicker and a viewpoint change button B2 for switching the virtual viewpoint may be displayed on the virtual world image. For example, when the user selects the kicker change button B1, the user can change the kicker from among the user characters UC who are present. For example, when the user selects the viewpoint change button B2, the user can return the virtual viewpoint to the overhead viewpoint VC1. The virtual world image G1 in a case where the virtual viewpoint returns to the overhead viewpoint VC1 is the angle as described with respect to FIG. 3. In this case as well, the user can select the viewpoint change button B2, and the virtual viewpoint may again be changed to the rear viewpoint VC2. In this way, through selection of the viewpoint change button B2, the user can switch the virtual viewpoint between the overhead viewpoint VC1 and the rear viewpoint VC2.

As illustrated in FIG. 17, in the rear viewpoint VC2, the ball B is displayed in the vicinity of the center of the display region (X coordinate value is in vicinity of $X_{MAX}/2$), and the angle of view is an angle in which the user aims at the goal GL of the opposing team from a position closer to the pitch PT than the overhead viewpoint VC1. Specifically, in the rear viewpoint VC2, the virtual world image G1 is displayed as if the user is standing on the pitch PT, and the goal GL of the opposing team is easily aimed at. Therefore, the user is likely to perform an intuitive operation, such as touching and tracing the ball B. In this regard, when the right-side region RA described in the first embodiment remains unchanged, this means that the ball B is displayed in the vicinity of the boundary of the right-side region RA, and hence even when the user tries to touch and move the ball B, the user may touch outside the right-side region RA and cannot move the ball B, which may cause an erroneous operation.

For example, in a case where the ball B is completely outside the right-side region RA, the user cannot move the ball B even when the user touches the ball B, which may cause an erroneous operation. For example, when the ball B is partially outside the right-side region RA, the position touched by the user may be slightly outside the right-side region RA. In this case, even when the user touches the ball B, the user cannot move the ball B, which may cause an erroneous operation. For example, when the ball B is almost outside the right-side region RA, the user may mistakenly touch outside the right-side region RA, which may cause an erroneous operation. Therefore, in the second embodiment, in the rear viewpoint VC2, the right-side region RA is enlarged to the left as a whole so that sufficient space is secured.

Figure 18:
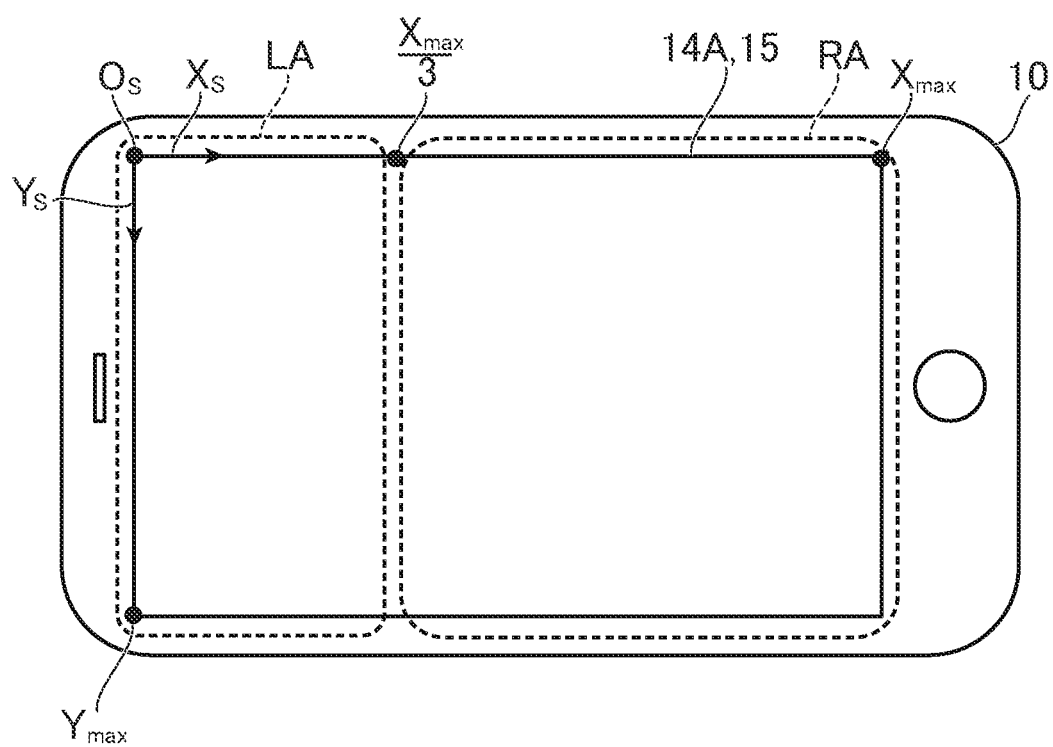
FIG. 18 is a diagram for illustrating the left-side region and the right-side region in a second embodiment of the present invention.

FIG. 18 is a diagram for illustrating the left-side region LA and the right-side region RA according to the second embodiment of the present invention. As illustrated in FIG. 18, in the second embodiment, in the rear viewpoint VC2, the right-side region RA is enlarged to the left. The right-side region RA may be enlarged in any degree, and the shape of the right-side region RA may be changed. In the example of FIG. 18, the right-side region RA is enlarged from the region in which the Xs coordinate is $X_{MAX}/2$ or more to a region in which the Xs coordinate is $X_{MAX}/3$ or more. When the user selects the viewpoint change button B2 and returns the virtual viewpoint to the overhead viewpoint VC1, the right-side region RA may return to its original size. For example, the operation mode in the case of the overhead viewpoint VC1 may be the same operation mode as when the ball is in play, but the operation mode in the case of the rear viewpoint VC2 is different from the operation mode when the ball is in play.

Figure 19:
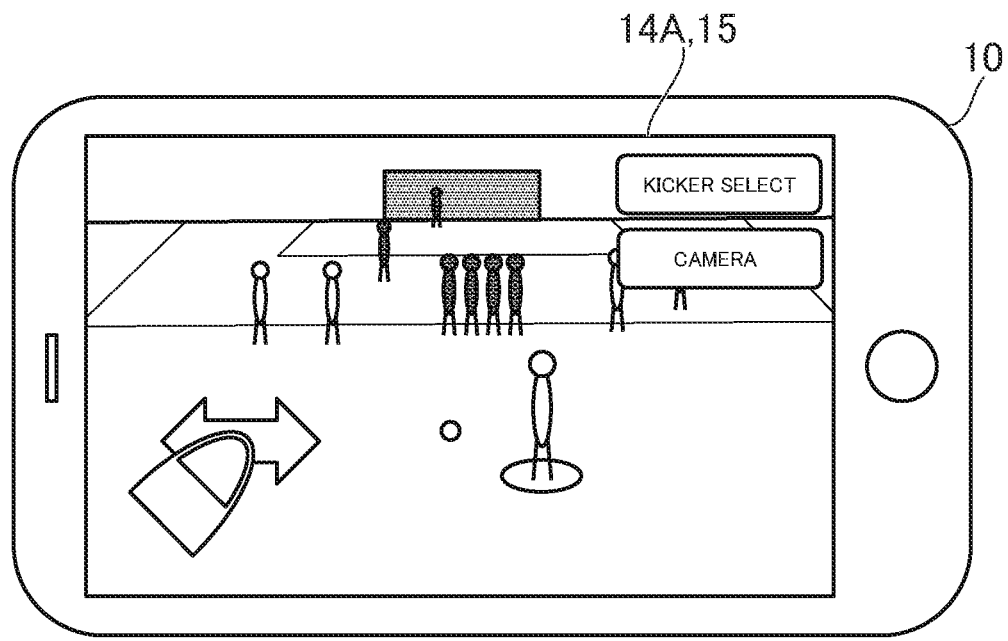
FIG. 19 is a diagram for illustrating an operation on the left-side region in the rear viewpoint.
Figure 19:
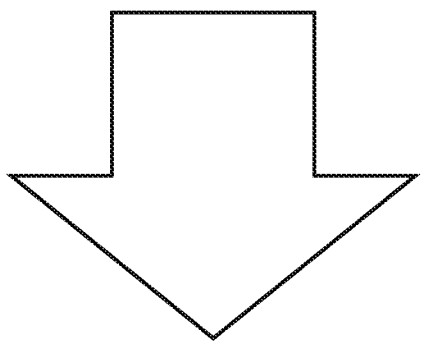
Figure 19:
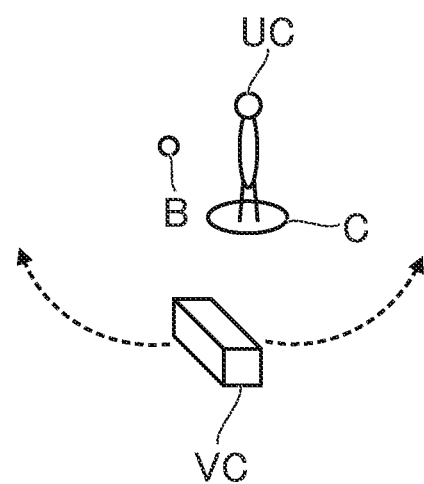

FIG. 19 is a diagram for illustrating an operation on the left-side region LA in the rear viewpoint VC2. For example, in the rear viewpoint VC2, the left-side region LA is used for controlling the virtual viewpoint. As illustrated in FIG. 19, for example, when the user performs a slide operation on the left-side region LA, the virtual viewpoint moves or changes direction in the slide direction. When the user stops the slide operation, the virtual viewpoint may return to the state before the slide operation is started, or may be fixed in the current state.

Figure 20:
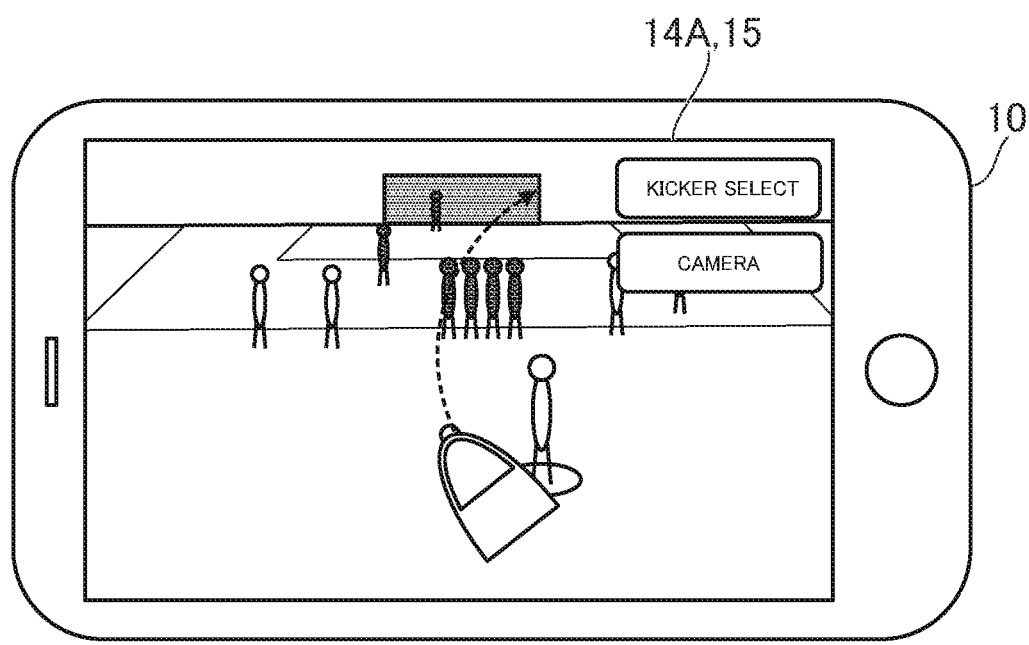
FIG. 20 is a diagram for illustrating an operation on the right-side region in the rear viewpoint.
Figure 20:
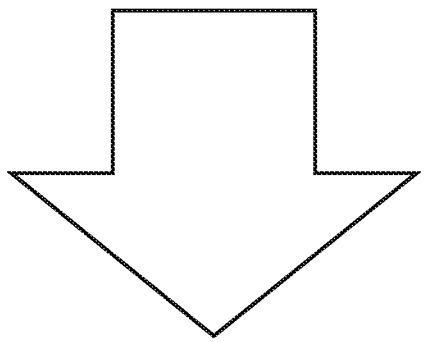
Figure 20:
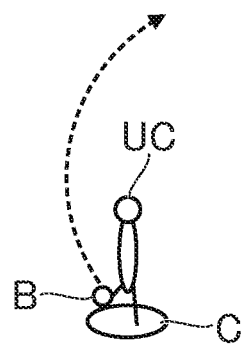

FIG. 20 is a diagram for illustrating an operation on the right-side region RA in the rear viewpoint VC2. As illustrated in FIG. 20, for example, when the user performs a flick operation with any trajectory on the right-side region RA, the ball B moves so as to trace along that trajectory. For example, the ball B may move so as to pass through the three-dimensional coordinates in the virtual world VW displayed on the trajectory drawn by the user, or the ball B may move so as to pass through the highest place among the three-dimensional coordinates on the trajectory. As described above, the right-side region RA is enlarged, and thus space for the user to touch the ball B is sufficiently secured. The starting point of the flick operation is only required to be at any position in the right-side region RA. In the second embodiment, it is not always required for the starting point to be the ball B.

As described above, when the user wishes to touch and move the ball B, the game control device 10 of the second embodiment enlarges the right-side region RA to secure sufficient space to touch the ball B. As a result, the user can perform an operation of touching the ball B, and an erroneous operation by the user is prevented. The details of this processing are now described below. In the following, when it is not particularly required to refer to the drawings, the reference symbols of the user character, the ball, and the like are omitted.

2-2. Functions to be Implemented in Second Embodiment

Figure 21:
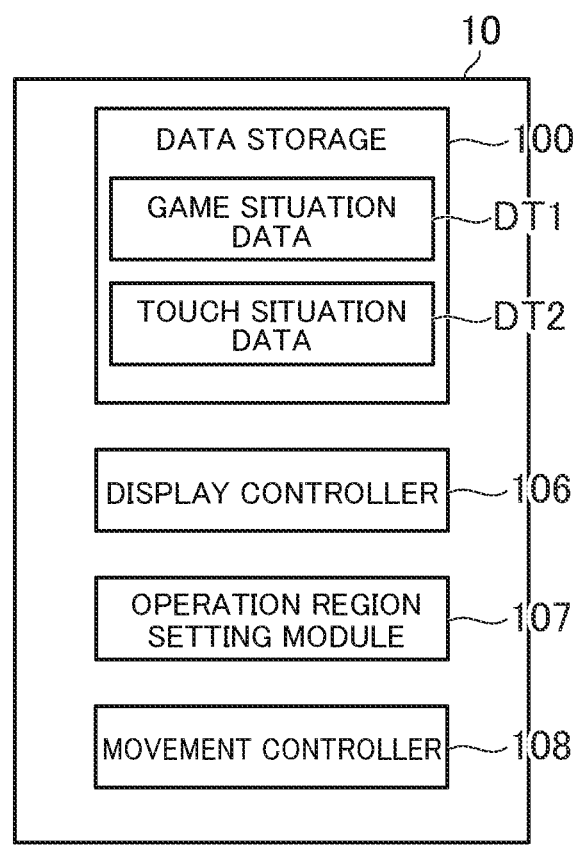
FIG. 21 is a function block diagram in the second embodiment of the present invention.

FIG. 21 is a function block diagram in the second embodiment of the present invention. As illustrated in FIG. 21, in the second embodiment, the game control device 10 implements the data storage 100, a display controller 106, an operation region setting module 107, and a movement controller 108. As illustrated in FIG. 21, the data stored in the data storage 100 may be the same as that of the first embodiment.

2-2-1. Display Controller

The display controller 106 is mainly implemented by the controller 11. The display controller 106 causes, in a game in which a ball is moved in response to an operation by the user on the touch panel 14A, the ball to be displayed on a display region. The operation here is, for example, an operation of touching the touch panel 14A. For example, this operation may be an operation of tapping the touch panel 14A or an operation of touching the touch panel 14A and then sliding along the touch panel 14A. In the second embodiment, a ball is described as an example of an object that moves in accordance with a user operation. Therefore, in the description of the second embodiment, the term "ball" can be read as "object".

In the second embodiment, the appearance of the virtual world in which the ball is arranged as seen from the virtual viewpoint is displayed in the display region, and thus the display controller 106 controls the position of the virtual viewpoint and the line-of-sight direction during execution of the game. The display controller 106 may be configured to control the position of the virtual viewpoint and the line-of-sight direction by any method. For example, the position of the virtual viewpoint and the line-of-sight direction may be controlled such that a predetermined positional relationship with the ball or the operation subject of the user is maintained. For example, the display controller 106 may control the position of the virtual viewpoint and the line-of-sight direction such that at least one of the ball and the operation subject of the user is within the field of view.

2-2-2. Operation Region Setting Module

The operation region setting module 107 is mainly implemented by the controller 11. The operation region setting module 107 sets a first region of the display region as the operation region. The first region is, for example, a part of a region on the touch panel 14A. The shape and size of the first region may be freely set, and may be, for example, a rectangle, a square, or a circle.

The operation region here is, for example, a region on the touch panel 14A in which an operation is received. For example, when a predetermined operation is performed on the operation region, processing associated with that operation region is executed. The predetermined operation is, for example, a tap operation, a slide operation, a flick operation, a swipe operation, a slide operation drawing a trajectory in a curved shape, a swipe stop operation, a pull-flick operation, or a pull-swipe stop operation. A plurality of operation regions may be provided to the touch panel 14A. The left-side region LA and the right-side region RA are examples of operation regions. However, in the second embodiment, as an example, there is described a case in which the first region set as the operation region is the right-side region RA. In this example, there is described a case in which the first region shows the right-side region RA in the overhead viewpoint.

In a predetermined game situation, when all of or a part of the ball is outside the first region, or the ball is arranged at an edge portion of the first region, the operation region setting module 107 changes the right-side region RA to a second region in which the ball is not arranged at the edge portion of the region.

The predetermined game situation is, for example, a situation in which the user wants to directly touch the displayed ball. For example, such a situation is a situation in which the ball is completely or partially outside the first region. More specifically, for example, the predetermined game situation is a situation in which all of the pixels in which the ball is displayed in the display region are outside the first region, or a part of those pixels is outside the first region. The predetermined game situation may also be, for example, a situation in which the ball is arranged at an edge portion of the first region. The edge portion of the first region is, for example, a pixel on an outer line of the first region, and the display position of the ball is within a predetermined distance from that pixel.

The predetermined game situation may be a situation in which the positional relationship between the virtual viewpoint and the ball is a predetermined relationship. The positional relationship is, for example, a relative position between the virtual viewpoint and the ball, a deviation between the position of the virtual viewpoint and the position of the ball, or a deviation between the line-of-sight direction of the virtual viewpoint and the direction of the plane on which the ball is arranged. The predetermined relationship is, for example, the deviation between the position of the virtual viewpoint and the position of the ball being less than a reference distance, or the deviation between the line-of-sight direction of the virtual viewpoint and the direction of the plane on which the ball is arranged being less than a reference angle. The predetermined game situation may be, for example, a situation in which the ball is displayed near the center of the screen. The predetermined game situation may also be, for example, a situation in which the virtual viewpoint has changed from an overhead viewpoint to a viewpoint on the field. In this case, the angle formed by the line-of-sight direction of the virtual viewpoint and the field is less than the reference angle and the distance between the virtual viewpoint and the field is less than the reference distance. The predetermined game situation may also be, for example, a situation in which, for a game in which the ball is moved to a target position (e.g., goal) like in soccer, the line-of-sight direction of the virtual viewpoint faces the target position.

The predetermined game situation may be, for example, a situation in which the ball stops during execution of the game. For example, for a game in which a sports match is performed, such a situation may occur when there is a foul in the match. In such a case, for example, there may be no opposition players in the surroundings and the target position of the ball may be easy to aim at, or the opposition players may be prevented from getting the ball. In a game in which players play against each other, for example, the predetermined game situation may be a situation in which the opposition players do not get in the way of moving the ball (e.g., free kick or PK). In the second embodiment, a situation in which a free kick is given and the virtual viewpoint switches to the rear viewpoint corresponds to the predetermined game situation.

The second region in which the ball is not arranged at the edge portion of the region is, for example, a region in which the edge portion of the region and the display position of the ball are a predetermined distance or more from each other, and the ball is not on an inner side of the region.

For example, the operation region setting module 107 enlarges, when the game reaches a predetermined game situation, the right-side region RA to a second region including at least the first region. For example, the second region is a region obtained by enlarging the first region. The enlargement direction may be freely set. For example, when the first region is arranged on the right side of the display region, the second region may be a region obtained by enlarging the first region in the left direction, or when the first region is arranged on the left side of the display region, the second region may be a region obtained by enlarging the first region in the right direction. The second region may also be, for example, a region including the first region and a surrounding region of the ball. The surrounding region is, for example, a region of a predetermined distance from the ball. The shape of the surrounding region may be freely set, and may be a rectangle, a square, or a circle. The surrounding region may have a fixed size or a variable size. The second region may be larger than, smaller than, or the same size as the first region. The second region may have the same shape as the first region or may have a different shape.

In the second embodiment, the display region has a horizontal width longer than the longitudinal width, the operation region setting module 107 can set a plurality of right-side regions RA, and the first region and the second region are regions to the right of another operation region (in this case, left-side region LA). In other words, as viewed from the user, the display region is a horizontally long display region, and the region that is enlarged when the virtual viewpoint switches to the rear viewpoint when a free kick is given is the right-side region RA furthest to the right.

2-2-3. Movement Controller

The movement controller 108 is mainly implemented by the controller 11. In the first embodiment, there is described a case in which the game processing execution module 105 moves the ball. However, in the second embodiment, there is described a case in which the movement controller 108 moves the ball. Therefore, the movement controller 108 may be configured to be able to execute the same processing as the game processing execution module 105. The movement controller 108 moves the ball based on a user operation on the right-side region RA. For example, the movement controller 108 moves the ball when the user performs a predetermined operation. For example, a relationship between types of operation and the manner of movement of the ball may also be defined in the data storage 100, and the movement controller 108 may move the ball in the manner of movement associated with the type of operation performed by the user. For example, when the user instructs the movement direction of the ball on the right-side region RA, the movement controller 108 moves the ball in the direction instructed by the user.

In the second embodiment, the operation performed by the user is an operation of moving the touch position after touching the right-side region RA, and thus the movement controller 108 moves the ball based on the operation even when the touch position has moved outside the right-side region RA during the movement. More specifically, when the touch position at which the touch on the touch panel 14A started is the right-side region RA, the movement controller 108 moves the ball based on a subsequent operation regardless of whether or not the subsequent touch position is in the right-side region RA.

For example, when the first region is set as the right-side region RA (i.e., right-side region RA in overhead viewpoint), the movement controller 108 moves the ball based on a first operation on the first region, and when the second region is set as the right-side region RA (i.e., right-side region RA in rear viewpoint), the movement controller 108 moves the ball based on a second operation on the second region. More specifically, when the right-side region RA in the overhead viewpoint is set, the movement controller 108 moves the ball based on a first operation mode, and when the right-side region RA in the rear viewpoint is set, the movement controller 108 moves the ball based on a second operation mode. In other words, the movement controller 108 sets a different operation mode for the right-side region RA when the first region is set as the right-side region RA (i.e., right-side region RA in overhead viewpoint) from when the second region is set as the right-side region RA (i.e., right-side region RA in rear viewpoint).

For example, the movement controller 108 sets a manner of movement of the ball differently when the first region is set as the right-side region RA (i.e., right-side region RA in overhead viewpoint) from when the second region is set as the right-side region RA (i.e., right-side region RA in rear viewpoint). The manner of movement is the trajectory, speed, or rotation of the ball. The trajectory is, for example, a height of the moving object. The rotation is, for example, a rotation direction or a rotation amount. For example, the movement controller 108 may set at least one of the trajectory, speed, and rotation of the ball to be different when the ball is to move in accordance with an operation on the right-side region RA in the overhead viewpoint from when the ball is to move in accordance with an operation on the right-side region RA in the rear viewpoint.

For example, in the case of the right-side region RA in the overhead viewpoint, the movement controller 108 moves the ball based on the operations described in the first embodiment. On the other hand, in the case of the right-side region RA in the rear viewpoint, when the user performs a flick operation tracing over the right-side region RA, the movement controller 108 moves the ball based on the trajectory. For example, the movement controller 108 may determine a curvature of the ball based on the curvature of the trajectory. In this case, the movement controller 108 may determine the rotation of the ball and the curve amount of the locus based on the angle between the movement direction of the touch position at the start of the flick operation and the movement direction of the touch position at the end of the flick operation. For example, the movement controller 108 may move the ball so as to pass through three-dimensional coordinates in the virtual world displayed at any point on the trajectory in the flick operation. For example, the movement controller 108 may also move the ball so as to pass through the three-dimensional coordinates in the virtual world displayed at the highest three-dimensional coordinates in the virtual world in the trajectory in the flick operation. In this way, when the user performs a flick operation so as to draw a large arc, the resulting kick will tend to rise into the air, and conversely when a flick operation close to a straight line is performed, the kick will tend to have a flat trajectory.

2-3. Processing to be Executed in Game Control Device

Figure 22:
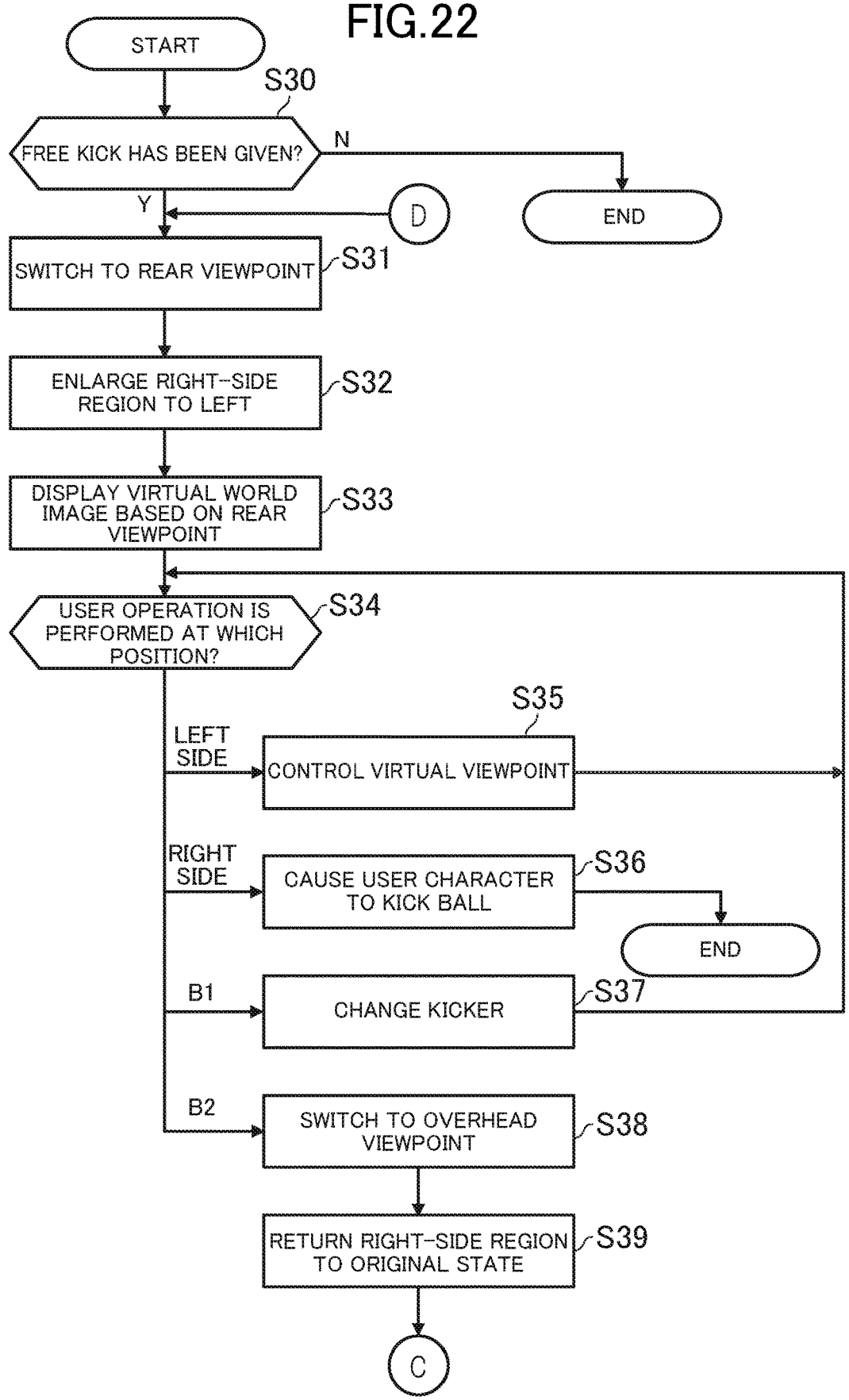
FIG. 22 is a flowchart for illustrating an example of processing to be executed in the game control device according to the second embodiment of the present invention.
Figure 23:
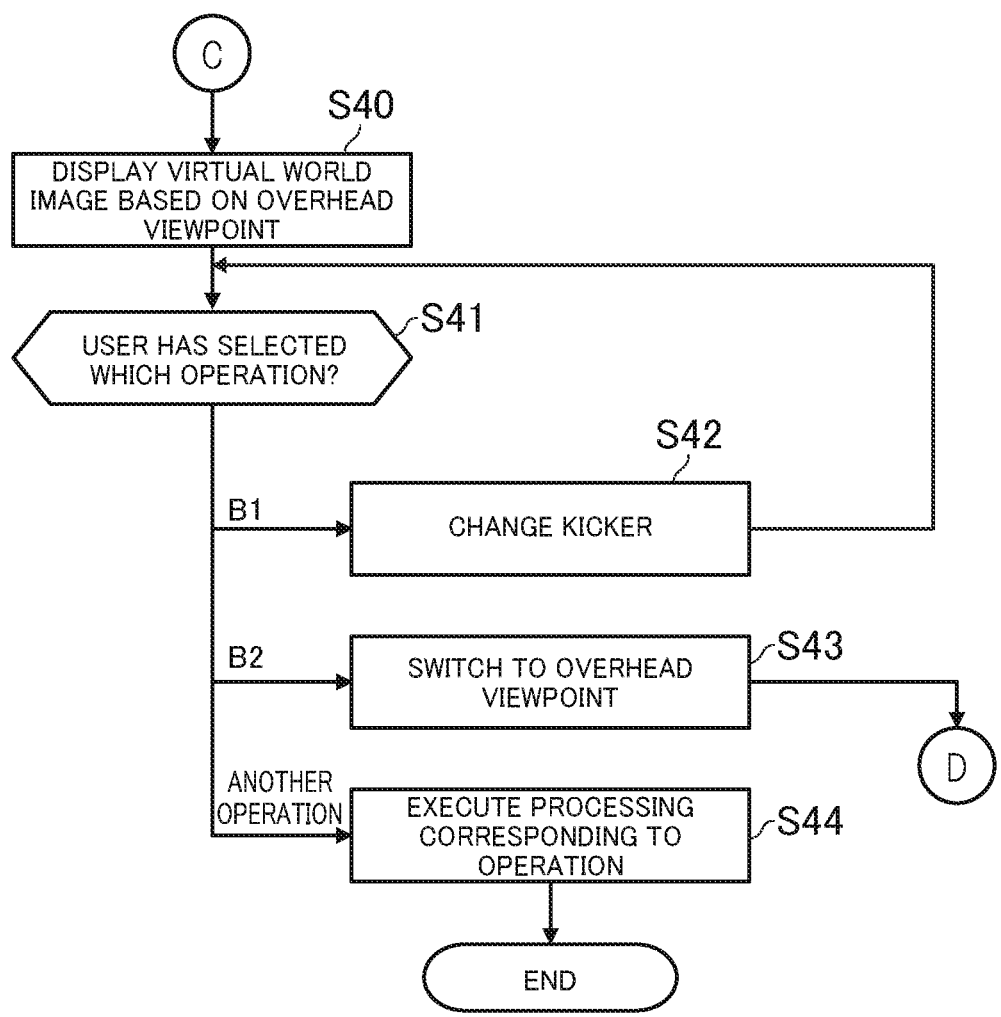
FIG. 23 is a flowchart for illustrating an example of processing to be executed in the game control device according to the second embodiment of the present invention.

FIG. 22 and FIG. 23 are flowcharts for illustrating an example of processing to be executed in the game control device in the second embodiment of the present invention. The processing illustrated in FIG. 22 and FIG. 23 is executed by the controller 11 performing actions in accordance with programs stored in the storage 12. The processing described here is an example of the processing by each of the function blocks illustrated in FIG. 21.

As illustrated in FIG. 22, the controller 11 determines, based on the game situation data DT1, whether or not the user team has acquired a free kick (Step S30). In Step S30, the controller 11 looks up the game situation data DT1 to specify the action of the opponent character, and determines whether or not the opponent character has performed a predetermined foul action. The foul action is only required to be an action determined in advance, and may be, for example, touching and causing the user character to fall over, or the ball touching the hand of the opponent character.

When it is not determined that the user team has acquired a free kick (Step S30: N), the controller 11 ends this processing. On the other hand, when it is determined that the user team has acquired a free kick (Step S30: Y), the controller 11 switches the virtual viewpoint to the rear viewpoint (Step S31). In Step S31, the controller 11 arranges the ball, for example, at the position at which the foul occurred or in the vicinity thereof. Then, the controller 11 selects a freely-selected user character as the kicker and arranges the kicker near the ball. The controller 11 changes the position of the virtual viewpoint and the line-of-sight direction so as to be arranged behind the user character selected as the kicker.

The controller 11 enlarges the right-side region RA to the left (Step S32). In Step S32, for example, the controller 11 enlarges the right-side region RA so as to extend to the left as a whole. The degree of enlargement of the right-side region RA may be fixed, or may be variable in accordance with the situation. The information identifying the enlarged right-side region RA is stored in advance in the storage 12.

The controller 11 displays the virtual world image G1 on the display 15 based on the rear viewpoint switched in Step S31 (Step S33). In Step S33, the controller 11 displays the virtual world image G1 in the state of FIG. 17 on the display 15. The controller 11 specifies the user operation based on the detection signal of the touch panel 14A (Step S34). In this case, it is assumed that any one of a slide operation on the left-side region LA, a flick operation on the right-side region RA, a selection of the kicker change button B1, or a selection of the viewpoint change button B2 is performed.

When the user performs a slide operation on the left-side region LA (Step S34: left side), the controller 11 controls the virtual viewpoint so as to move in the slide direction (Step S35), and returns the processing to Step S34. In S35, the controller 11 determines the movement direction of the virtual viewpoint based on the slide direction. The controller 11 determines the movement distance of the virtual viewpoint based on the distance the touch position has moved in the slide operation.

When the user performs a flick operation on the right-side region RA (Step S34: right-side region), the controller 11 causes the user character to kick the ball based on the trajectory instructed by the flick operation (Step S36), and then ends this processing. In Step S36, the controller 11 looks up the touch situation data and specifies the touch position history in the flick operation. The controller 11 specifies the highest point in the virtual worlds displayed in the touch position. The controller 11 determines the trajectory such that the ball passes from the current position through the highest point. Then, the controller 11 plays back the motion data, causes the operation subject to perform a kick action, and moves the ball along the determined trajectory.

When the user selects the kicker change button B1 (Step S34: B1), the controller 11 changes the kicker among the user characters that are present (Step S37), and returns the processing to Step S34. When the user selects the viewpoint change button B2 (Step S34: B2), the controller 11 switches the virtual viewpoint to the overhead viewpoint (Step S38), and returns the right-side region RA to its original state (Step S39). In Step S38, the controller 11 changes the position of the virtual viewpoint and the line-of-sight direction stored in the game situation data to those for the overhead viewpoint. In Step S39, the controller 11 stops the enlargement of the right-side region RA, and returns the right-side region RA to its original state.

Referring to FIG. 23, the controller 11 displays the virtual world image G1 on the display 15 based on the overhead viewpoint (Step S40). The controller 11 specifies the user operation based on the detection signal of the touch panel 14A (Step S41). In this case, it is assumed that a selection of the kicker change button B1, a selection of the viewpoint change button B2, or another operation is performed. The another operation may be one of the various in-play operations described in the first embodiment, for example, a flick operation, a swipe stop operation, a pull-flick operation, or a pull-swipe stop operation on the right-side region RA.

When the user selects the kicker change button B1 (Step S41: B1), the controller 11 changes the kicker among the user characters that are present (Step S42), and returns the processing to Step S41. When the user selects the viewpoint change button B2 (Step S41: B2), the controller 11 returns the processing to Step S2, switches the virtual viewpoint to the rear viewpoint, and again enlarges the right-side region RA (Step S43). When the user performs another operation (S41; another operation), the controller 11 executes processing corresponding to the operation (Step S44), and ends this processing. In Step S44, the controller 11 causes the user character to perform, for example, a ground pass or a fly pass. This processing itself may be the same as the processing described in the first embodiment, and hence a description thereof is omitted here.

According to the game control device 10 described above, in situations in which erroneous operations by the user tend to occur, such as a situation in which the ball is completely or partially outside the first region (in this case, right-side region RA during overhead viewpoint) or a situation in which the ball is arranged at an edge portion of the first region, it is possible for the right-side region RA to be changed to a region in which the ball is not arranged at an end portion, and the intuitive operation of touching the ball can be performed. Thus, erroneous operations can be prevented. In particular, in situations different from those described above (i.e., when it is unlikely that the user wants to directly touch the displayed ball), the vicinity of the display position of the ball can be assigned to perform another operation, which enables the region on the touch panel 14A to be used effectively. For example, in a soccer game in which it is assumed that the game is played by holding a smartphone or the like horizontally, the center of the screen is often set as a boundary, with the left-side region LA serving as a virtual pad region and the right-side region RA serving as an action input region. For example, in many cases, while viewing the pitch in a virtual viewpoint, a user moves the players by performing operations on the left-side region LA, which is the virtual pad region, and passes, shoots, and the like by performing operations on the right-side region RA, which is the action input region, to progress through the match. In the second embodiment, at a time of a set play like a free kick during a match, the virtual viewpoint is switched from the overhead viewpoint to the rear viewpoint and the user performs an operation to kick the ball by performing an operation on the right-side region RA, which is the action input region, while moving the line-of-sight direction of the virtual viewpoint by performing an operation on the left-side region LA, which is the virtual pad region. In the second embodiment, kicking the ball during a set play is performed by touching any position on the right-side region RA, which is the action input region, and then performing a flick operation (as described above, it is not required to touch the ball at the start), but a user who performs operations intuitively tends to perform the flick operation by first touching the ball. However, during such a set play, the ball is arranged at the center of the screen, which serves as the boundary between the left-side region LA and the right-side region RA, when the user first tries to touch the ball, and thus the user may perform an erroneous operation of touching the virtual pad region by mistake instead of the action input region. Therefore, in the second embodiment, when an object, such as a ball, that is likely to be touched by the user is arranged in the center of the screen, the right-side region RA is enlarged such that at least the whole object is included in the action input region. This enables erroneous operations of a user who performs operations intuitively to be prevented.

The right-side region RA is changed when the virtual viewpoint switches to the rear viewpoint, and thus erroneous operations can be prevented in situations in which the virtual viewpoint and the ball have a specific positional relationship and the user wants to touch the ball.

The right-side region RA is changed when a free kick is given, and thus when the ball is stationary and the user is aiming carefully, the user tends to want to touch the ball, to thereby be capable of preventing erroneous operations of the user more effectively.

The processing of moving the ball is executed even when the touch position has been moved outside the right-side region RA, and thus the processing can be prevented from changing when the touch position moves into another operation region.

In a specific situation such as when the user wants to touch the displayed ball directly, the original right-side region RA is enlarged and operations can be performed on the original right-side region RA, and thus it is possible to provide operations corresponding to a preference of the user.

With a physical game controller, for example, in many cases, a button on the right side is used to kick and move the ball, but even with the touch panel 14A, natural operability that is familiar to the user can be provided by performing an operation on the right-side region RA, which is on the right side, to move the ball.

The operation mode may be changed in accordance with the set right-side region RA, and various kinds of operations corresponding to the situation may be provided to the user.

The manner of movement of the ball varies depending on the set right-side region RA, and thus the ball may be moved in a manner of movement corresponding to the situation of the game.

3. Modification Example

The present invention is not limited to the embodiments described above. The present invention may be appropriately changed within a scope that does not depart from the spirit of the present invention.

3-1. Modification Example Relating to First Embodiment

First, there is described a modification example relating to the first embodiment. For example, in the first embodiment, there is described a case in which when the user performs a pull-flick operation and a pull-swipe stop operation, the position at which the user turned back the movement direction of the touch position is set as the base position, and the movement direction of the ball is determined based on the subsequent movement direction. On the contrary, the movement direction of the ball may also be determined based on the movement direction of the touch position before the turn-back position.

Figure 24:
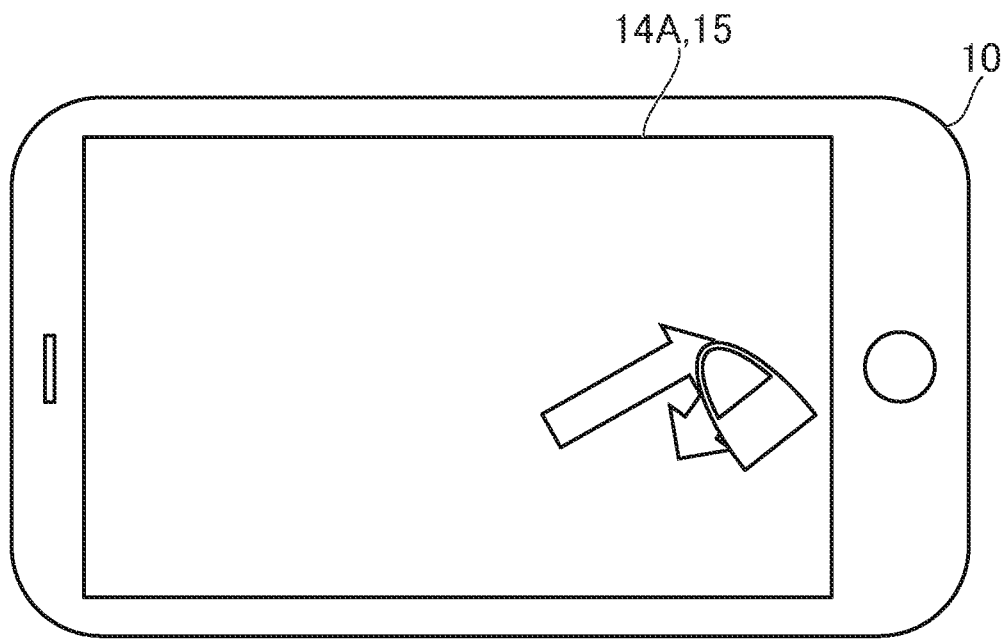
FIG. 24 is a diagram for illustrating an operation in a modification example of the present invention.
Figure 24:
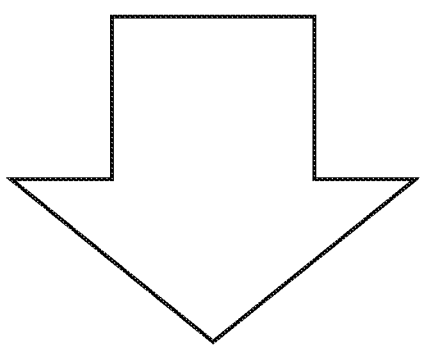
Figure 24:
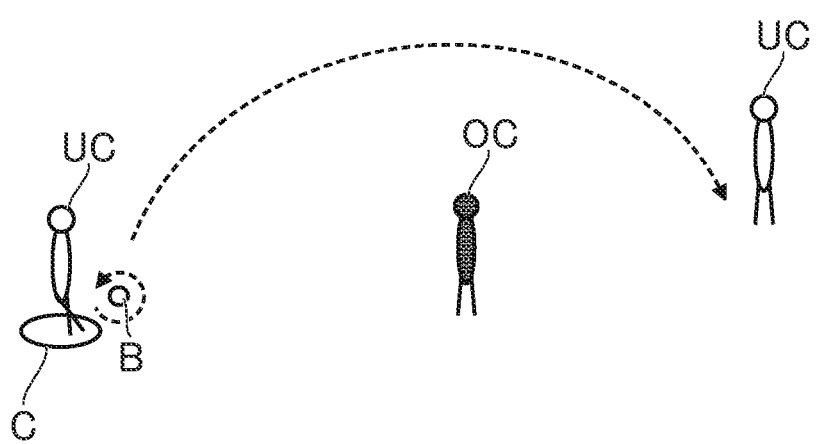
Figure 25:
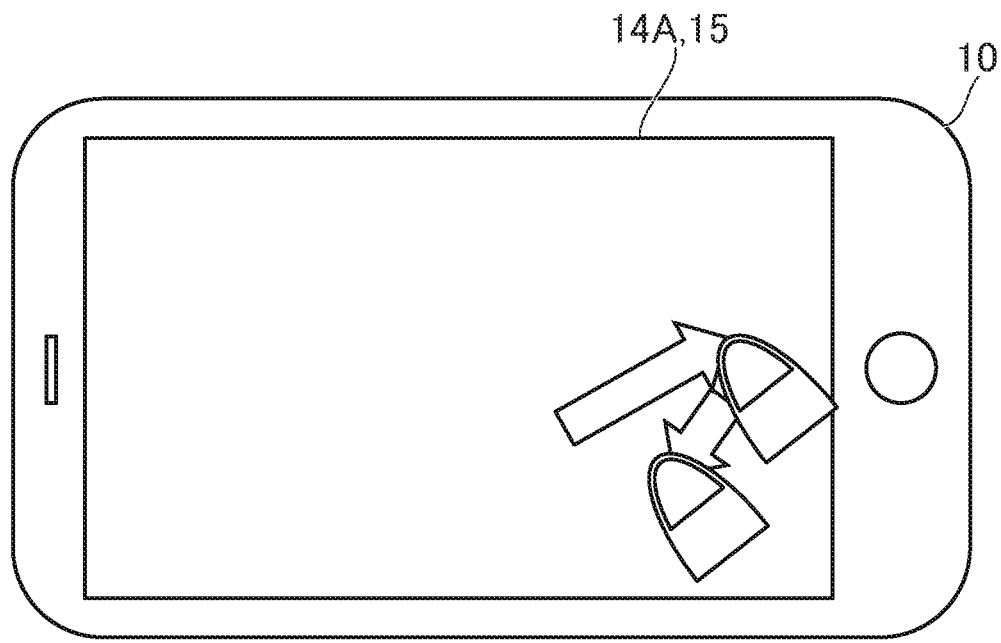
FIG. 25 is a diagram for illustrating an operation in a modification example of the present invention.
Figure 25:
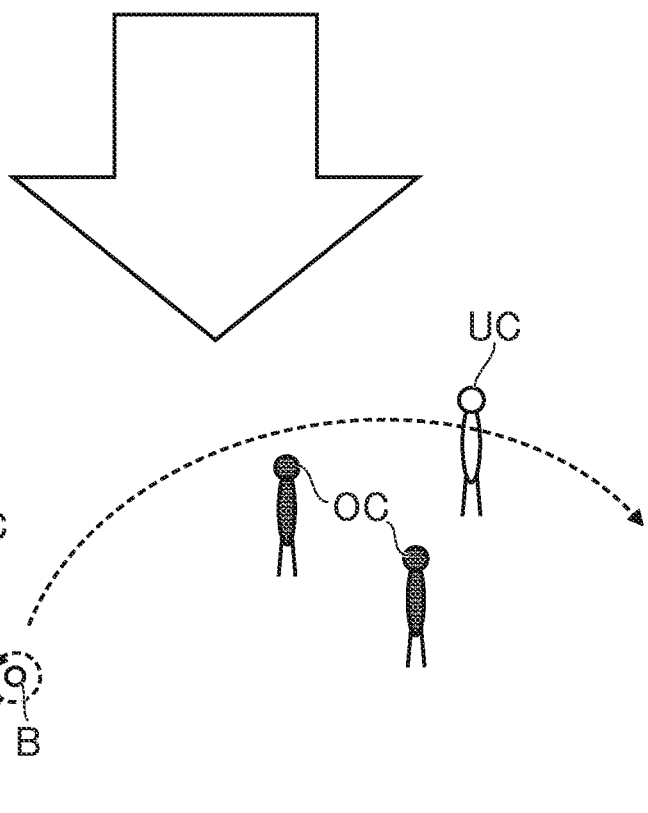

FIG. 24 and FIG. 25 are diagrams for illustrating an operation in a modification example of the present invention. As illustrated in FIG. 24, for example, when the user performs a swipe operation on the right-side region RA in the direction that he or she wants to pass the ball and then performs a slight flick operation in the reverse direction, the user character UC may perform a fly pass in the swipe direction. In this case, for example, unlike the fly pass of the first embodiment, a back spin may be applied to the ball B. When the operation in FIG. 24 is described as a push-flick operation, only one of the push-flick operation and the pull-flick operation may be set as being a valid operation, or both of them may be set as being a valid operation. When both the push-flick operation and the pull-flick operation are set to be a valid operation, the determination regarding whether the push-flick operation has been performed or the pull-flick operation has been performed may be performed based on which of a first distance, which is between the touch position at the start of the touch and the turn-back position of the movement direction, and a second distance, which is between and the turn-back position of the movement direction and the release position of the touch, is longer. When the first distance is shorter than the second distance, the operation may be determined to be a pull-flick operation, and when the second distance is shorter than the first distance, the operation may be determined to be a push-flick operation. The determinations may be performed by the detection module 102 or the game processing execution module 105.

As illustrated in FIG. 25, for example, when the user performs a swipe operation on the right-side region RA in the direction that he or she wants to pass the ball and then performs a slight swipe operation in the reverse direction to stop the touch position, the user character UC may perform a fly through pass in the initial swipe direction. In this case, for example, unlike the fly through pass of the first embodiment, a back spin may be applied to the ball B. When the operation in FIG. 25 is described as a push-swipe stop operation, only one of the push-swipe stop operation and the pull-swipe stop operation may be set as being a valid operation, or both of them may be set as being a valid operation. When both the pull-swipe stop operation and the push-swipe stop operation are set to be a valid operation, the determination regarding whether the pull-swipe stop operation has been performed or the push-swipe stop operation has been performed may be performed based on which of a third distance, which is between the touch position at the start of the touch and the turn-back position of the movement direction, and a fourth distance, which is between and the turn-back position of the movement direction and the stop position of the touch, is longer. When the third distance is shorter than the fourth distance, the operation may be determined to be a pull-swipe stop operation, and when the fourth distance is shorter than the third distance, the operation may be determined to be a push-swipe stop operation. The determinations may be performed by the detection module 102 or the game processing execution module 105.

In the press-flick operation and the press-swipe stop operation, the game processing execution module 105 may move the ball in a determined direction based on the touch position before the detection module 102 detects the turning back of the movement direction and the touch position in a case where the detection module 102 detects the turning back. For example, the game processing execution module 105 may execute the fly pass or the fly through pass based on at least one of the direction of or the distance between the touch position serving as the starting point of the movement direction at a predetermined timing and the touch position (turn-back position) serving as the starting point of the movement direction after the change. Performing the processing in this way enables, for example, intuitive operations to be performed, such as the user character UC moving the ball while applying backspin, thereby increasing the operations that can be provided to the user even more.

The first embodiment and the second embodiment may be combined, but in the first embodiment, the processing of enlarging the right-side region RA like in the second embodiment is not always required, and may be omitted. For example, only one of the pull-flick operation and the pull-swipe stop operation may be implemented. For example, when the user performs a pull-flick operation, a fly pass may be executed without particularly considering the distance between the base position and the touch position immediately before the touch is released. For example, when the user performs a pull-swipe stop operation, a fly through pass may be executed without particularly considering the distance between the base position and the touch position in a case where the movement of the touch position has stopped or almost stopped.

3-2. Modification Example Relating to Second Embodiment

Next, there is described a modification example relating to the second embodiment. For example, the user team may acquire a penalty kick when the opposing team has fouled. A penalty kick is a penalty given in response to a foul that has occurred in the penalty area against the team that has fouled. When a penalty kick is given, a kick is performed from a predetermined position in the penalty area with a kicker and a goalkeeper in a one-on-one state. Even in the case of the user team acquiring a penalty kick, the right-side region RA may be enlarged to the left as described in the second embodiment.

Figure 26:
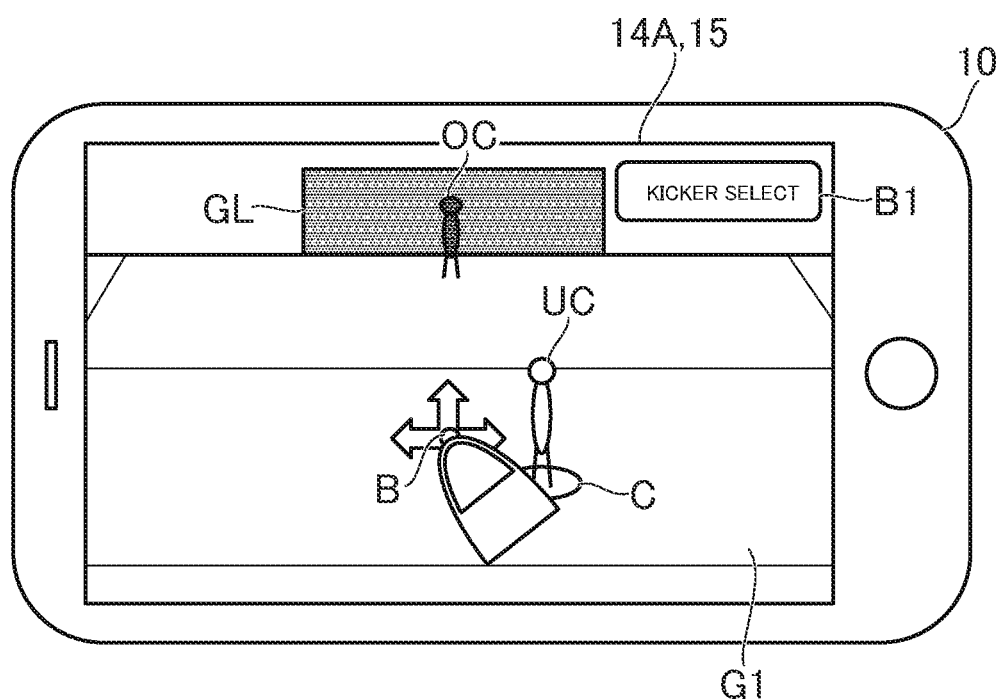
FIG. 26 is a diagram for illustrating the virtual world image in a case where a user team acquires a penalty kick.
Figure 26:
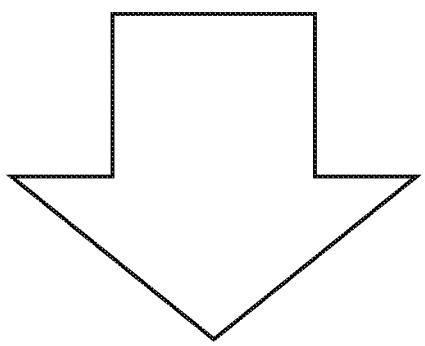
Figure 26:
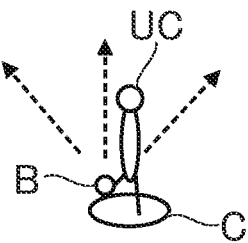

FIG. 26 is a diagram for illustrating the virtual world image G1 in a case where the user team acquires a penalty kick. As illustrated in FIG. 26, even when the user team acquires a penalty kick, the virtual viewpoint is switched to the rear viewpoint. Therefore, with a penalty kick, the user is in a state in which he or she wants to touch and move the ball B. In this case, similarly in the case of FIG. 18, the right-side region RA may be enlarged to the left. In a penalty kick, it is not particularly required to use the left-side region LA to perform operations. For example, the user instructs a shoot trajectory by performing a flick operation in the right-side region RA.

For example, contrary to the above, there are also cases in which the user team fouls and the opposing team is given a penalty kick. In this case, the user cannot instruct the movement of the ball B, and thus the user may instruct the goalkeeper instead. More specifically, the game executed in the second embodiment is a game in which a plurality of objects, such as the ball B, the user character, and the opponent character, move. In such a game, the movement controller 108 may cause, among the plurality of objects, the object to be controlled when the first region is the right-side region RA (i.e., right-side region RA in overhead viewpoint) to be different from when the second region is set as the right-side region RA (i.e., right-side region RA in rear viewpoint). The data in which the object to be controlled is defined for each of the above-mentioned cases is stored in advance in the data storage 100, and the movement controller specifies the object to be controlled by referring to that data.

Figure 27:
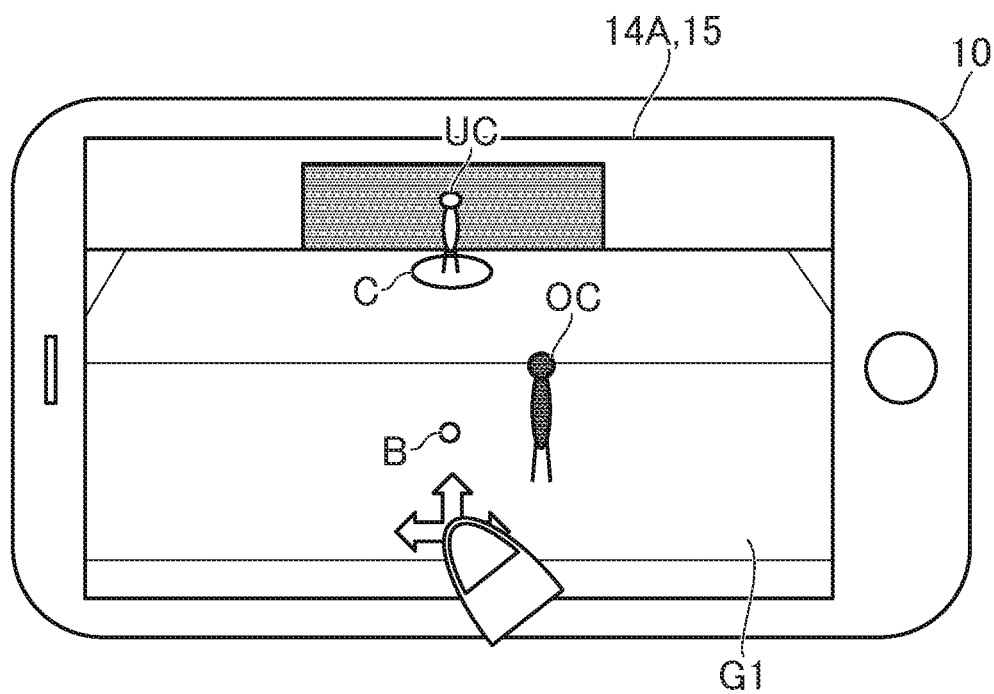
FIG. 27 is a diagram for illustrating the virtual world image in a case where an opposing team acquires a penalty kick.
Figure 27:
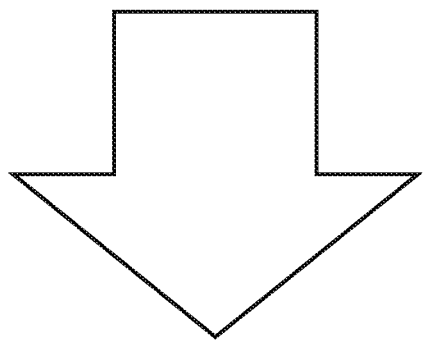
Figure 27:
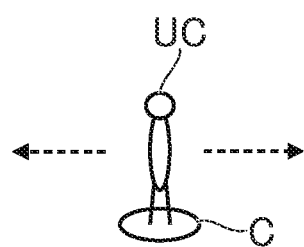

FIG. 27 is a diagram for illustrating the virtual world image when the opposing team acquires a penalty kick according to one embodiment of the present invention. As illustrated in FIG. 27, even when the opposing team acquires a penalty kick, the virtual viewpoint switches to the rear viewpoint. However, in this case, the virtual viewpoint is the rear viewpoint of the opponent character OC, who is the kicker. Also when the opposing team acquires a penalty kick, similarly to the case in FIG. 18, the right-side region RA may be enlarged to the left. In a penalty kick, it is not particularly required to use the left-side region LA to perform operations. For example, by performing a flick operation in the right-side region RA, the user instructs the direction in which the user character UC, who is the goal keeper, is to move. For example, the action for preventing the shoot may change based on an ability of the goalkeeper. With the configuration illustrated in FIG. 27, it is possible to move the object in accordance with the situation of the game.

For example, there has been described a case in which, when a free kick is given, the whole of the right-side region RA is enlarged to the left, but the right-side region RA may also be enlarged by combining the original right-side region RA and a peripheral region of the ball. The surrounding region of the ball is a region including the positions less than a predetermined distance from the ball. The shape of the surrounding region may be circular, elliptical, or polygonal. For example, there has been described a case in which the right-side region RA is enlarged, but when it is possible to instruct the movement of the ball in the left-side region LA, the left-side region LA may be enlarged. The right-side region RA may also be enlarged when, for example, another set play other than a free kick is performed. For example, the right-side region RA may be enlarged in the case of a throw-in or a corner kick.

The first embodiment and the second embodiment may be combined, but in the second embodiment, the pull-flick operation and the pull-swipe stop operation as in the first embodiment are not always required, and may be omitted. For example, the situations in which the right-side region RA is enlarged are not limited to situations in which progress of the game is stopped, as in a free kick. For example, it is not always required for the right-side region RA to be enlarged, and at least one of a size and a shape may be changed so as to include the ball. For example, there has been described a horizontally long display region as an example, but in a longitudinally long display region, the operation region may be enlarged. For example, it is not particularly required for the operation mode to be changed before and after the enlargement of the right-side region RA. For example, the manner of movement of the ball may be the same before and after the enlargement of the right-side region RA.

3-3. Other Modification Examples

For example, two or more of the first embodiment, the second embodiment, and the modification examples described above may be combined.

For example, each function implemented in the game control device 10 may be implemented in the server 30. For example, the data storage 100 may be implemented by the server 30. In this case, the data storage 100 is mainly implemented by the storage 32. The game control device 10 executes the game by receiving data from the server 30. The game control device 10 transmits the execution result of the game to the server 30, and various pieces of data stored in the server 30 are updated.

For example, the main processing of the game may be executed in the server 30. In this case, the server 30 corresponds to the game control device according to the present invention. For example, in the first embodiment, when the direction acquisition module 101, the detection module 102, the speed acquisition module 103, the speed determination module 104, and the game processing execution module 105 are implemented in the server 30, those modules are mainly implemented by the controller 31. For example, in the second embodiment, when the display controller 106, the operation region setting module 107, and the movement controller 108 are implemented in the server 30, those modules are mainly implemented by the controller 31. In this case, the game control device 10 receives the image data from the server 30 and displays the virtual world image G1 on the display 15. The game control device 10 transmits data representing an instruction received by the operation device 14 and the touch panel 14A to the server 30. When this data is received, the server 30 may identify the user instruction and execute the game. For example, each function may be shared between the game control device 10 and the server 30. In this case, the processing result of each function block may be transmitted and received to and from the game control device 10 and the server 30.

For example, there has been described a case in which a soccer game is executed, but the processing of the present invention may be applied to another game. For example, the processing of the present invention may be applied to a sports game other than a soccer game (e.g., game based on baseball, tennis, American football, basketball, or volleyball). In addition to sports games, for example, the processing of the present invention may also be applied to various games regardless of game type or genre, such as action games and role-playing games.

4. Supplementary Note

From the above description, the present invention is grasped as follows, for example.

4-1. Invention According to First Embodiment 1-1) A game control device (10, 30) according to one embodiment of the present invention includes: a direction acquisition module (101) configured to acquire a movement direction of a touch position, when the touch position moves while a touch panel is being touched; a game processing execution module (105) configured to execute first game processing based on the movement direction acquired by the direction acquisition module (101); and a detection module (102) configured to detect that the movement direction acquired by the direction acquisition module (101) has changed to any movement direction having an angle of a predetermined angle or more with respect to a movement direction acquired at a predetermined timing. The game processing execution module (105) is configured to execute second game processing based on one of the movement direction before the change and the movement direction after the change, when the change in the movement direction is detected by the detection module (102).

1-9) A game control system (S) according to one embodiment of the present invention includes: a direction acquisition module (101) configured to acquire a movement direction of a touch position, when the touch position moves while a touch panel is being touched; a game processing execution module (105) configured to execute first game processing based on the movement direction acquired by the direction acquisition module (101); and a detection module (102) configured to detect that the movement direction acquired by the direction acquisition module (101) has changed to any movement direction having an angle of a predetermined angle or more with respect to a movement direction acquired at a predetermined timing. The game processing execution module (105) is configured to execute second game processing based on one of the movement direction before the change and the movement direction after the change, when the change in the movement direction is detected by the detection module (102).

1-10) A program according to one embodiment of the present invention causes a computer to function as the game control device (10, 30) of any one of Items 1-1) to 1-8) or the game system (S) of Item 1-9).

1-11) An information storage medium according to one embodiment of the present invention is a computer-readable information storage medium having recorded thereon the program of Item 1-10).

1-2) In one embodiment of the present invention, the game processing execution module (105) is configured to execute the second game processing in accordance with release of the touch on the touch panel, when the change in the movement direction is detected by the detection module (102).

1-3) In one embodiment of the present invention, the game processing execution module (105) is configured to execute the second game processing based on a distance between the touch position serving as a starting point of the movement direction after the change, and the touch position at a time when the touch on the touch panel is released, when the change in the movement direction is detected by the detection module (102).

1-4) In one embodiment of the present invention, the game processing execution module (105) is configured to execute third game processing in accordance with one of the movement of the touch position having stopped and the movement of the touch position having almost stopped, when the change in the movement direction is detected by the detection module (102).

1-5) In one embodiment of the present invention, the game processing execution module (105) is configured to execute the third game processing based on a distance between the touch position serving as a starting point of the movement direction after the change, and the touch position at one of a time when the movement of the touch position has stopped and a time when the movement of the touch position has almost stopped, when the change in the movement direction is detected by the detection module (102).

1-6) In one embodiment of the present invention, the game control device (10, 30) includes: a speed acquisition module (103) configured to acquire a movement speed of the touch position, when the touch position moves while the touch panel is being touched; and a speed determination module (104) configured to determine whether or not the movement speed acquired by the speed acquisition module (103) is a reference speed or more. The movement direction acquired at the predetermined timing is a movement direction at a time when it is determined that the movement speed is the reference speed or more.

1-7) In one embodiment of the present invention, the first game processing is processing of moving a moving object in a virtual world based on the movement direction acquired by the direction acquisition module (101), and the second game processing is processing of moving the moving object in the virtual world in a manner of movement different from a manner of movement of the first game processing.

1-8) In one embodiment of the present invention, the first game processing and the second game processing are each processing in which an operation subject moves a moving object in a virtual world. The game processing execution module (105) is configured to execute the first game processing based on one of: a movement direction acquired under a state in which the operation subject is holding the moving object; and a movement direction acquired during a period before the operation subject touches the moving object, and to execute the second game processing based on one of: a movement direction acquired under a state in which the operation subject is holding the moving object; and a movement direction acquired during a period before the operation subject touches the moving object.

4-2. Invention According to Second Embodiment 2-1) A game control device (10) according to one embodiment of the present invention includes, in a game in which an object moves in accordance with a user operation on a touch panel: a display control module (106) configured to display the object on a display region; an operation region setting module (107) configured to set a first region of the display region as an operation region; and a movement control module (108) configured to move the object based on the user operation on the operation region. The operation region setting module (107) is configured to change the operation region to a second region in which the object is not arranged at the edge portion of the region, in a predetermined game situation, namely, when the object is completely or partially outside the first region, or the object is arranged at an edge portion of the first region.

2-10) A game control system (S) according to one embodiment of the present invention includes, in a game in which an object moves in accordance with a user operation on a touch panel: a display control module (106) configured to display the object on a display region; an operation region setting module (107) configured to set a first region of the display region as an operation region; and a movement control module (108) configured to move the object based on the user operation on the operation region. The operation region setting module (107) is configured to change the operation region to a second region in which the object is not arranged at the edge portion of the region, in a predetermined game situation, namely, when the object is completely or partially outside the first region, or the object is arranged at an edge portion of the first region.

2-11) A program according to one embodiment of the present invention causes a computer to function as the game control device (10) of any one of Items 2-1) to 2-9) or the game system (S) of Item 2-10).

2-12) An information storage medium according to one embodiment of the present invention is a computer-readable information storage medium having recorded thereon the program of Item 2-11).

2-2) In one embodiment of the present invention, an appearance of a virtual world in which the object is arranged as seen from a virtual viewpoint is displayed in the display region. The display control module (106) controls a position of the virtual viewpoint and a line-of-sight direction during execution of the game. The predetermined game situation is a situation in which a positional relationship between the virtual viewpoint and the object is a predetermined relationship.

2-3) In one embodiment of the present invention, the predetermined game situation is a situation in which the object is stationary during execution of the game.

2-4) In one embodiment of the present invention, the operation is an operation of moving the touch position after touching the operation region. The movement control module (108) is configured to move the ball based on the operation even when the touch position has moved outside the operation region during the movement.

2-5) In one embodiment of the present invention, the operation region setting module (107) is configured to enlarge the operation region to a second region including at least the first region, when the game reaches a predetermined game situation.

2-6) In one embodiment of the present invention, the display region has a horizontal width longer than a longitudinal width, the operation region setting module (107) is configured to set a plurality of operation regions, and the first region and the second region are regions to the right of another operation region.

2-7) In one embodiment of the present invention, when the first region is set as the operation region, the movement control module (108) is configured to move the object based on a first operation on the first region, and when the second region is set as the operation region, the movement control module 108 moves the object based on a second operation on the second region.

2-8) In one embodiment of the present invention, the movement control module (108) is configured to set a manner of movement of the object differently when the first region is set as the operation region from when the second region is set as the operation region.

2-9) In one embodiment of the present invention, the game is a game in which a plurality of objects are moved, and the movement control module (108) sets an object to be controlled among the plurality of objects differently when the first region is set as the operation region from when the second region is set as the operation region.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game control device, comprising:
   at least one processor,
   the at least one processor being configured to:
      display an object on a display region, in a game in which the object is moved in accordance with an operation of a user on a touch panel;
      set a first region of the display region as an operation region;
      move the object based on the operation of the user on the operation region; and
      change the operation region to a second region, in which the object is prevented from being arranged at an edge portion of the second region, in a predetermined game situation, which is one of a situation in which at least a part of the object is outside the first region and a situation in which the object is arranged at an edge portion of the first region.

2. The game control device according to claim 1,
   wherein an appearance of a virtual world in which the object is arranged as seen from a virtual viewpoint is displayed in the display region,
   wherein the at least one processor is configured to control a position of the virtual viewpoint and a line-of-sight direction of the virtual viewpoint during execution of the game, and
   wherein the predetermined game situation includes a situation in which a positional relationship between the virtual viewpoint and the object is a predetermined relationship.

3. The game control device according to claim 1, wherein the predetermined game situation includes a situation in which the object is stationary during execution of the game.

4. The game control device according to claim 1,
   wherein the operation includes an operation of moving a touch position after touching the operation region, and
   wherein the at least one processor is configured to move the object based on the operation even when the touch position has moved outside the operation region during the movement.

5. The game control device according to claim 1, wherein the at least one processor is configured to enlarge the operation region to the second region including at least the first region, when the game reaches the predetermined game situation.

6. The game control device according to claim 1,
   wherein the display region has a lateral width longer than a longitudinal width of the display region,
   wherein the at least one processor is configured to set a plurality of operation regions, and
   wherein the first region and the second region include regions on a right side of another operation region.

7. The game control device according to claim 1, wherein the at least one processor is configured to move the object based on a first operation on the first region when the first region is set as the operation region, and to move the object based on a second operation on the second region when the second region is set as the operation region.

8. The game control device according to claim 1, wherein the at least one processor is configured to set different manners of movement of the object between a case in which the first region is set as the operation region and a case in which the second region is set as the operation region.

9. The game control device according to claim 1,
wherein the game includes a game in which a plurality of objects are moved, and
wherein the at least one processor is configured to set different objects to be controlled among the plurality of objects between a case in which the first region is set as the operation region and a case in which the second region is set as the operation region.

10. A game system, comprising at least one processor,
the at least one processor being configured to:
display an object on a display region, in a game in which the object is moved in accordance with an operation of a user on a touch panel;
set a first region of the display region as an operation region;
move the object based on the operation of the user on the operation region; and
change the operation region to a second region, in which the object is prevented from being arranged at an edge portion of the second region, in a predetermined game situation, which is one of a situation in which at least a part of the object is outside the first region and a situation in which the object is arranged at an edge portion of the first region.

11. A non-transitory information storage medium having stored thereon a program for causing a computer to:
display an object on a display region, in a game in which the object is moved in accordance with an operation of a user on a touch panel;
set a first region of the display region as an operation region;
move the object based on the operation of the user on the operation region; and
change the operation region to a second region, in which the object is prevented from being arranged at an edge portion of the second region, in a predetermined game situation, which is one of a situation in which at least a part of the object is outside the first region and a situation in which the object is arranged at an edge portion of the first region.

* * * * *